US011040448B2

(12) United States Patent
Reekmans et al.

(10) Patent No.: US 11,040,448 B2
(45) Date of Patent: Jun. 22, 2021

(54) METHODS AND SYSTEMS FOR ESTABLISHING AND MAINTAINING A PRE-BUILD RELATIONSHIP

(71) Applicant: X Development LLC, Mountain View, CA (US)

(72) Inventors: Eli Reekmans, San Francisco, CA (US); Marek Michalowski, San Francisco, CA (US); Michael Beardsworth, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 140 days.

(21) Appl. No.: 16/392,761

(22) Filed: Apr. 24, 2019

(65) Prior Publication Data

US 2019/0308321 A1 Oct. 10, 2019

Related U.S. Application Data

(63) Continuation of application No. 15/481,909, filed on Apr. 7, 2017, now Pat. No. 10,307,908.

(51) Int. Cl.
*G05B 15/02* (2006.01)
*B25J 9/16* (2006.01)

(52) U.S. Cl.
CPC ............ *B25J 9/1669* (2013.01); *B25J 9/163* (2013.01); *B25J 9/1605* (2013.01); *G05B 15/02* (2013.01); *Y10S 901/02* (2013.01)

(58) Field of Classification Search
None
See application file for complete search history.

(56) References Cited

U.S. PATENT DOCUMENTS 5,434,489 A 7/1995 Cheng et al.
5,903,459 A 5/1999 Greenwood et al.
(Continued)

FOREIGN PATENT DOCUMENTS

CN 104325462 2/2015
CN 105598957 5/2016
(Continued)

OTHER PUBLICATIONS

PCT International Preliminary Report on Patentability in International Appln. No. PCT/US2018/023772, dated Oct. 8, 2019, 7 pages.
(Continued)

*Primary Examiner* — Jason Lin
(74) *Attorney, Agent, or Firm* — Fish & Richardson P.C.

(57) ABSTRACT

Described herein are methods and systems to establish a pre-build relationship in a model that specifies a first parameter for a first feature of a structure and a second parameter for a second feature of the structure. In particular, a computing system may receive data specifying a pre-build relationship that defines a build value of the first parameter in terms of a post-build observed value of the second parameter. During production of the structure, the computing system may determine the post-build observed value of the second parameter and, based on the determined post-build observed value, may determine the build value of the first parameter in accordance with the pre-build relationship. After determining the build value, the computing system may then transmit, to a robotic system, an instruction associated with production of the first feature by the robotic system, with that instruction specifying the determined build value of the first parameter.

20 Claims, 12 Drawing Sheets

(56) References Cited

U.S. PATENT DOCUMENTS

| | | | |
|---|---|---|---|
| 8,924,011 B2 * | 12/2014 | Park | B25J 9/1617 |
| | | | 700/245 |
| 9,333,654 B2 * | 5/2016 | Chen | B25J 9/1697 |
| 2003/0120377 A1 | 6/2003 | Hooke et al. | |
| 2004/0251866 A1 | 12/2004 | Gan et al. | |
| 2005/0065659 A1 | 3/2005 | Tanaka et al. | |
| 2007/0299557 A1 | 12/2007 | Watanabe et al. | |
| 2008/0221733 A1 * | 9/2008 | Morrow | G05B 19/401 |
| | | | 700/258 |
| 2009/0112357 A1 | 4/2009 | Hammond et al. | |
| 2014/0309762 A1 * | 10/2014 | Hayata | B25J 9/1682 |
| | | | 700/114 |
| 2015/0019013 A1 * | 1/2015 | Rose | B25J 15/10 |
| | | | 700/258 |
| 2015/0277430 A1 | 10/2015 | Linnell | |
| 2016/0136815 A1 | 5/2016 | Linnell | |
| 2016/0311116 A1 | 10/2016 | Hill | |
| 2016/0346928 A1 * | 12/2016 | Zhang | B25J 9/1679 |
| 2018/0004188 A1 | 1/2018 | Yamaguchi et al. | |
| 2018/0290305 A1 | 10/2018 | Reekmans et al. | |

FOREIGN PATENT DOCUMENTS

| | | |
|---|---|---|
| JP | H04211807 | 8/1992 |
| JP | H06-068206 | 3/1994 |
| JP | 2010182058 | 8/2010 |
| JP | 2014083610 | 5/2014 |
| KR | 1020160070744 | 6/2016 |
| WO | 2006019970 | 2/2006 |
| WO | 2015187271 | 12/2015 |

OTHER PUBLICATIONS

CN Office Action in Chinese Appln. No. 201880023892.3, dated Apr. 27, 2020, 11 pages (with English translation).

PCT International Search Report and Written Opinion in International Appln. No. PCT/US2018/023772, dated Mar. 22, 2018, 8 pages.

EP Extended Search Report in Eruopean Appln. No. 18781586.5, dated Feb. 12. 2021, 15 pages.

JP Office Action in Japanese Appln. No. 2019-550780, dated Dec. 2, 2020, 6 pages (with English translation).

KR Office Action in Korean Appln. No. 10-2019-7032637, dated Mar. 30, 2021, 6 pages (with English translation).

* cited by examiner

METHODS AND SYSTEMS FOR ESTABLISHING AND MAINTAINING A PRE-BUILD RELATIONSHIP

CROSS-REFERENCE TO RELATED APPLICATION

This application is a continuation of U.S. application Ser. No. 15/481,909, filed Apr. 7, 2017, the contents of which are incorporated by reference herein.

BACKGROUND

Robotic systems may be used for applications involving material handling, welding, assembly, dispensing, and fabrication, among others. Over time, the manner in which these robotic systems operate is becoming more intelligent, more efficient, and more intuitive. As robotic systems become increasingly prevalent in numerous aspects of modern life, the need for systems that provide for accurate structure design and production becomes apparent. Therefore, a demand for such systems has helped open up a field of innovation in modeling techniques, sensing techniques, as well as structure design and production techniques.

SUMMARY

Existing modeling environments provide the capability of implicitly defining a relationship between parameters of a structure. But such an implicitly defined relationship is not always maintained during production of the structure (i.e., during "build time"). As a result, the structure may end up having structural and/or functional problems, among other possibilities.

Disclosed herein are various implementations for establishing or otherwise defining explicit relationship(s) between parameters of a structure, such that those relationship(s) are maintained during build time. In particular, given at least first and second features of the structure, a computing system may receive data specifying a pre-build relationship that defines a build value of a first parameter of the first feature in terms of a post-build observed value of a second parameter of the second feature. Once the computing system determines the post-build observed value during build time, the computing system may then determine the build value in accordance with the received pre-build relationship. And once the build value is determined, a construction specialist (e.g., human and/or robotic system) could then produce the first feature such that the first parameter has the determined build value.

Consequently, by explicitly defining a relationship during a pre-build modeling phase, and prioritizing that relationship over pre-defined values of parameters at build time, important structural and/or functional relationships between features can be maintained at build time, even when there are deviations from modeled parameters for the features.

By way of example, when a designer wishes for two features to have a certain positional relationship (could also be referred to as a spatial relationship) with one another, the designer would typically have specified this positional relationship implicitly, e.g., by defining the positions of the two features in the model, such that the two features have this relationship. However, during fabrication, if the actual position of the one (or both) of the features deviates from the model, the desired positional relationship can be lost. As note, this may cause the structure to have structural and/or functional problems, among other possibilities.

To help better maintain such desired positional relationship, the disclosed implementations may allow a designer to explicitly define such a positional relationship (e.g., a distance) between features at the modeling phase. For instance, the designer may specify explicit coordinates for the position of a first feature in a worksite, but define a second feature in terms of a positional relationship with the first feature; e.g., parallel to and separated by a certain distance from the first feature. As such, when the feature is fabricated in the worksite, sensors may be used to observe the actual position of the first feature, and the build parameters for the second feature may be determined or updated so that the relationship defined in the model is better maintained in the actual build, even when there is an error (e.g., that does not exceed a threshold error) in the actual positioning of the first feature. Other examples are possible as well.

In one aspect, a method is provided. The method may involve receiving, by a computing system, input data specifying a pre-build relationship for a model that represents a structure, where the model specifies a first build parameter for a first feature of the structure and a second build parameter for a second feature of the structure, and where the pre-build relationship defines a build value of the first build parameter in terms of a post-build observed value of the second build parameter. The method may also involve, during production of the structure represented by the model, determining, by the computing system, the post-build observed value of the second build parameter. The method may additionally involve, based on the determined post-build observed value of the second build parameter, determining, by the computing system, the build value of the first build parameter in accordance with the received pre-build relationship. The method may further involve, after determining the build value of the first build parameter, transmitting, by the computing system to a robotic system, an instruction associated with production of the first feature by the robotic system, where the instruction specifies the determined build value of the first build parameter according to which the first feature should be produced.

In another aspect, a computing system is provided. The computing system includes one or more processors, a non-transitory computer readable medium, and program instructions stored on the non-transitory computer readable medium and executable by the one or more processors to perform functions. In particular, the program instructions may be executable to receive input data specifying a pre-build relationship for a model that represents a structure, where the model specifies a first build parameter for a first feature of the structure and a second build parameter for a second feature of the structure, and where the pre-build relationship defines a build value of the first build parameter in terms of a post-build observed value of the second build parameter. Also, the program instructions may be executable to, during production of the structure represented by the model, determine the post-build observed value of the second build parameter. Additionally, the program instructions may be executable to, based on the determined post-build observed value of the second build parameter, determine the build value of the first build parameter in accordance with the received pre-build relationship. Further, the program instructions may be executable to, after determining the build value of the first build parameter, transmit, to a robotic system, an instruction associated with production of the first feature by the robotic system, where the instruction specifies the determined build value of the first build parameter according to which the first feature should be produced.

In yet another aspect, another method is provided. The method may involve displaying, by a computing system, a graphical interface comprising one or more interface features to specify pre-build relationships for computer-generated models of structures to be produced. The method may also involve receiving, via the graphical interface, input data specifying a pre-build relationship that defines a build value of a first build parameter in terms of a post-build observed value of a second build parameter, where the first build parameter is of a first feature of a structure, wherein the second build parameter is of a second feature of the structure, where the post-build observed value is determined during production of the structure, and where the build value is determined based on the determined post-build observed value in accordance with the specified pre-build relationship. The method may additionally involve, after the build value is determined, displaying, on the graphical interface, a graphical representation of the determined build value of the first build parameter.

In yet another aspect, another system is provided. The system may include means for receiving input data specifying a pre-build relationship for a model that represents a structure, where the model specifies a first build parameter for a first feature of the structure and a second build parameter for a second feature of the structure, and where the pre-build relationship defines a build value of the first build parameter in terms of a post-build observed value of the second build parameter. The system may also include means for, during production of the structure represented by the model, determining the post-build observed value of the second build parameter. The system may additionally include means for, based on the determined post-build observed value of the second build parameter, determining the build value of the first build parameter in accordance with the received pre-build relationship. The system may further include means for, after determining the build value of the first build parameter, transmitting, to a robotic system, an instruction associated with production of the first feature by the robotic system, where the instruction specifies the determined build value of the first build parameter according to which the first feature should be produced.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
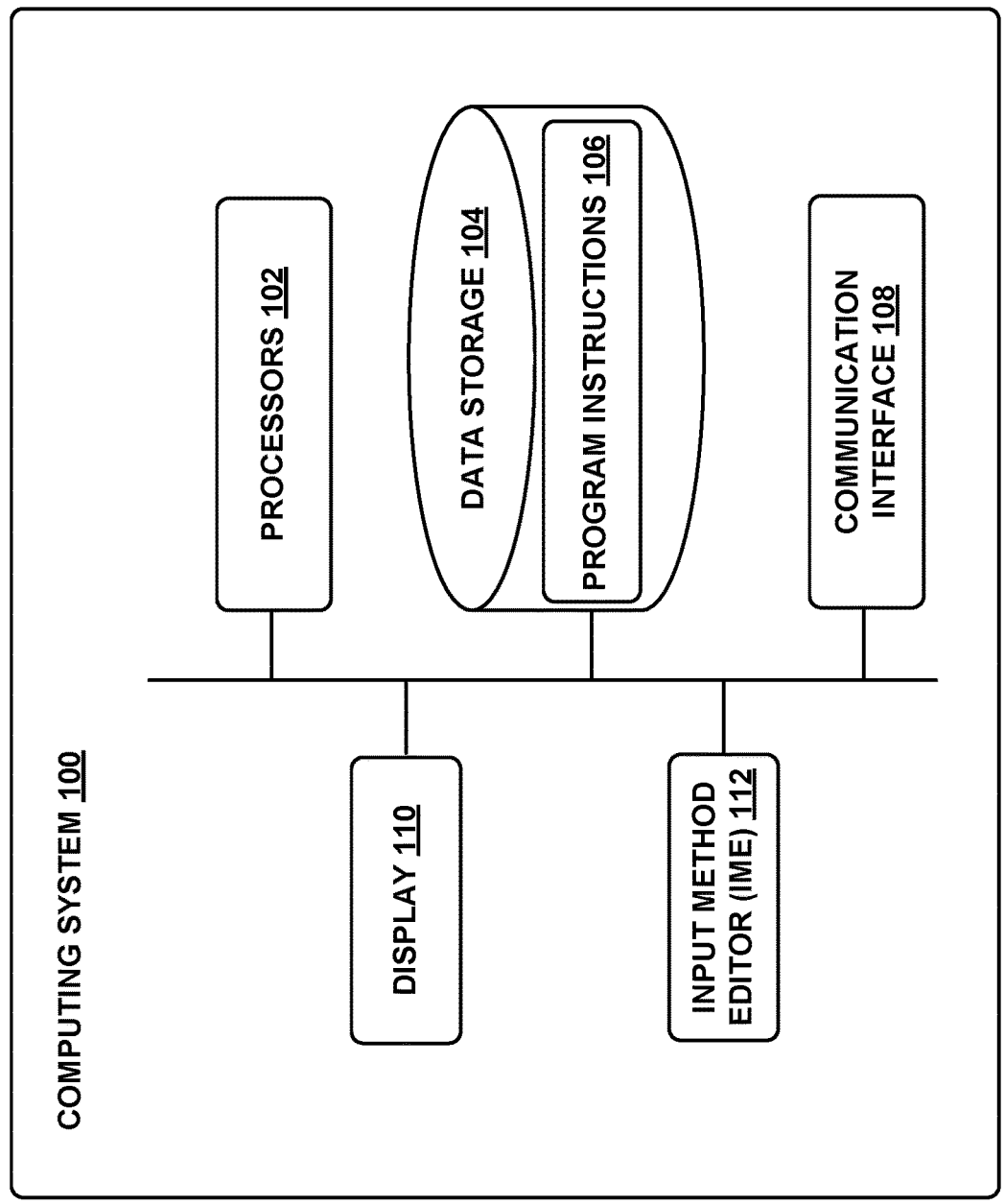
FIG. 1 is a simplified block diagram illustrating components of a computing system, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

Example implementations may relate to methods and systems that assist with design and production of physical structure(s). In practice, a model of a structure may be created using a graphical interface of a computing system, and then a construction specialist (e.g., human and/or robotic system) may work to produce the structure in accordance with that model. Furthermore, various parameters of various features of the structure are generally each defined in the model to have a certain planned/pre-build values. Unfortunately, however, an actual/post-build observed value of a parameter may sometimes end up being different from the planned value of that parameter, which may result in important relationship(s) between parameters implicitly defined in a modeling environment not being realized in the structure that is ultimately built. This could lead to structural and/or functional problems in the structure, among other possibilities.

By way of example, the model may respectively define positions of first and second features of the structure each relative to a global coordinate system. But the actual position of the second feature may end up being different from the planned position of the second feature. Although the design of the structure may allow to a certain extent (e.g., within a threshold error) for the actual position of the second feature to be different from the planned position of the second feature, the design may still require a certain positional relationship between the first and second features (e.g., the first feature may need to be positioned at a distance of three meters away from the second feature). And in many cases, that positional relationship may not be met if the actual position of the second feature is different from the planned position of the second feature.

To help address such problems, the present disclosure provides for methods and systems that may help increase the probability that certain relationships are substantially maintained between respective values of parameters, and that such relationships are substantially maintained regardless of the actual value that one of those parameters ends up exhibiting. Furthermore, although the present disclosure is applicable in the context of positional relationships, the relationships are not limited to positional relationships. Thus, the present disclosure could apply in the context of a relationship between any parameter(s) of any feature(s) of a structure. For instance, the disclosure may apply in the context of a relationship between a density of a first feature (e.g., airplane body) and a curvature of a second feature (e.g., airplane wing), among other options.

In accordance with the present disclosure, a computing system may receive input data specifying a pre-build relationship for a model that represents a structure to be produced. In practice, the computing system may receive such input data via a graphical interface through which a modeling specialist generates the model of the structure and/or may receive the input data in other ways. Nonetheless, that pre-build relationship may define a relationship between at least a first parameter of a first feature of the structure and a second parameter of a second feature of the structure, and do so before those parameters are produced and perhaps even before production of those features or the structure itself begins. Moreover, in some cases, the first and second features at issue may be the same feature of the structure, and thus the pre-build relationship may be a relationship between two or more parameters of the same feature. Other cases are possible as well.

More specifically, the pre-build relationship may define a build value of the first parameter relative to or otherwise in terms of a post-build observed value of the second parameter. In particular, based on the pre-build relationship, the build value of the first parameter may initially be defined relative to a "to be determined" value of the second parameter that is yet to be fully produced. Thus, although the first parameter could optionally have a predefined build value, the build value may only be determined absolutely after the value of the second parameter has been observed or otherwise determined, which may only occur after the second feature is at least partially produced to exhibit that second parameter.

As such, once the second feature is actually produced and/or during production of the second feature, the computing system may determine the post-build observed value of the second parameter. For instance, a robotic system partaking in construction of the structure may use its sensors to receive sensor data representative of the structure. And based on that sensor data, the computing system may determine the post-build observed value of the second parameter. Other instances are also possible.

In-line with the discussed above, once the computing system determines the post-build observed value of the second parameter, the computing system may then use that determined the post-build observed value as basis for determining the build value of the first parameter in accordance with the received pre-build relationship. Thus, the computing system may then update the model such that the model specifies the determined build value and such that a graphical representation of the determined build value could be displayed via the graphical interface. Additionally or alternatively, the computing system may transmit to a robotic system an instruction associated with production of the first feature, with the provided instructions specifying the determined build value according to which the first feature should be produced, thereby ensuring that the pre-build relationship is maintained.

In an example implementation of the present disclosure, the pre-build relationship may predefine a distance (e.g., three meters) away from the second feature at which the first feature should be produced. In this way, once the second feature has been produced and the position of the second feature has been determined within a global coordinate system of the structure, the position of the first feature could then be defined within that global coordinate system to be at the predefined distance away from the determined position of the second feature. Thus, the computing system may then instruct a robotic system to produce the first feature at the defined position, thereby ensuring that the predefined positional relationship is maintained.

II. Example System for Design and Production of a Structure

A. Computing System

Referring now to the figures, FIG. 1 is a block diagram showing components of a computing system 100. Generally, the computing system 100 may take the form of a desktop computer, a laptop, a tablet, a wearable computing device, a mobile phone, a chip set, a server system, a digital signal processor, a programmable logic controller, and/or a sampled-data system, among other possibilities.

As shown, the computing system 100 may include one or more processors 102, data storage 104, program instructions 106, communication interface 108, display 110, and Input Method Editor (IME) 112. Note that the computing device 100 is shown for illustration purposes only and computing system 100 may include additional components and/or have one or more components removed without departing from the scope of the disclosure. Further, note that the various components of computing system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to carry out various functions described herein, among others The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The communication interface 108 may allow computing system 100 to communicate, using analog or digital modulation, with other devices, servers, access networks, and/or transport networks. Thus, communication interface 108 may facilitate circuit-switched and/or packet-switched communication, such as plain old telephone service (POTS) communication and/or Internet protocol (IP) or other packetized communication. For instance, communication interface 108 may include a chipset and antenna arranged for wireless communication with a radio access network or an access point. Also, communication interface 108 may take the form of or include a wireline interface, such as an Ethernet, Universal Serial Bus (USB), or High-Definition Multimedia Interface (HDMI) port. Communication interface 108 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1008. Furthermore, communication interface 108 may comprise multiple physical communication interfaces (e.g., a Wifi interface, a BLUETOOTH® interface, and a wide-area wireless interface).

Display 110 may take on any form (e.g., LED, LCD, OLED, etc.). Further, display 110 may be a touchscreen display (e.g., a touchscreen display on a tablet). Display 110 may show a graphical user interface (GUI) that may provide an application through which a user may interact with the systems disclosed herein.

Further, the computing system 100 may receive user input (e.g., from the user of the computing system 100) via IME 112. In particular, the IME 112 may allow for interaction with the GUI such as for scrolling, providing text, and/or selecting various features of the application, among other possible interactions. The IME 112 may take on various forms. In one example, the IME 112 may be a pointing device such as a computing mouse used for control of the GUI. However, if display 110 is a touchscreen display, user touch input can be received (e.g., such as using a finger or a stylus) that allows for control of the GUI. In another example, IME 112 may be a text IME such as a keyboard that provides for selection of numbers, characters and/or symbols to be displayed via the GUI. For instance, in the arrangement where display 110 is a touchscreen display, portions of the display 110 may show the IME 112. Thus, touch-input on the portion of the display 110 including the IME 112 may result in user-input such as selection of specific numbers, characters, and/or symbols to be shown on the GUI via display 110. In yet another example, the IME 112 may be a voice IME that may be used that receives audio input, such as from a user via a microphone (not shown) of the computing system 100, that is then interpretable using one of various speech recognition techniques into one or more characters than may be shown via display 110. Other examples may also be possible.

B. Robotic System

Figure 2:
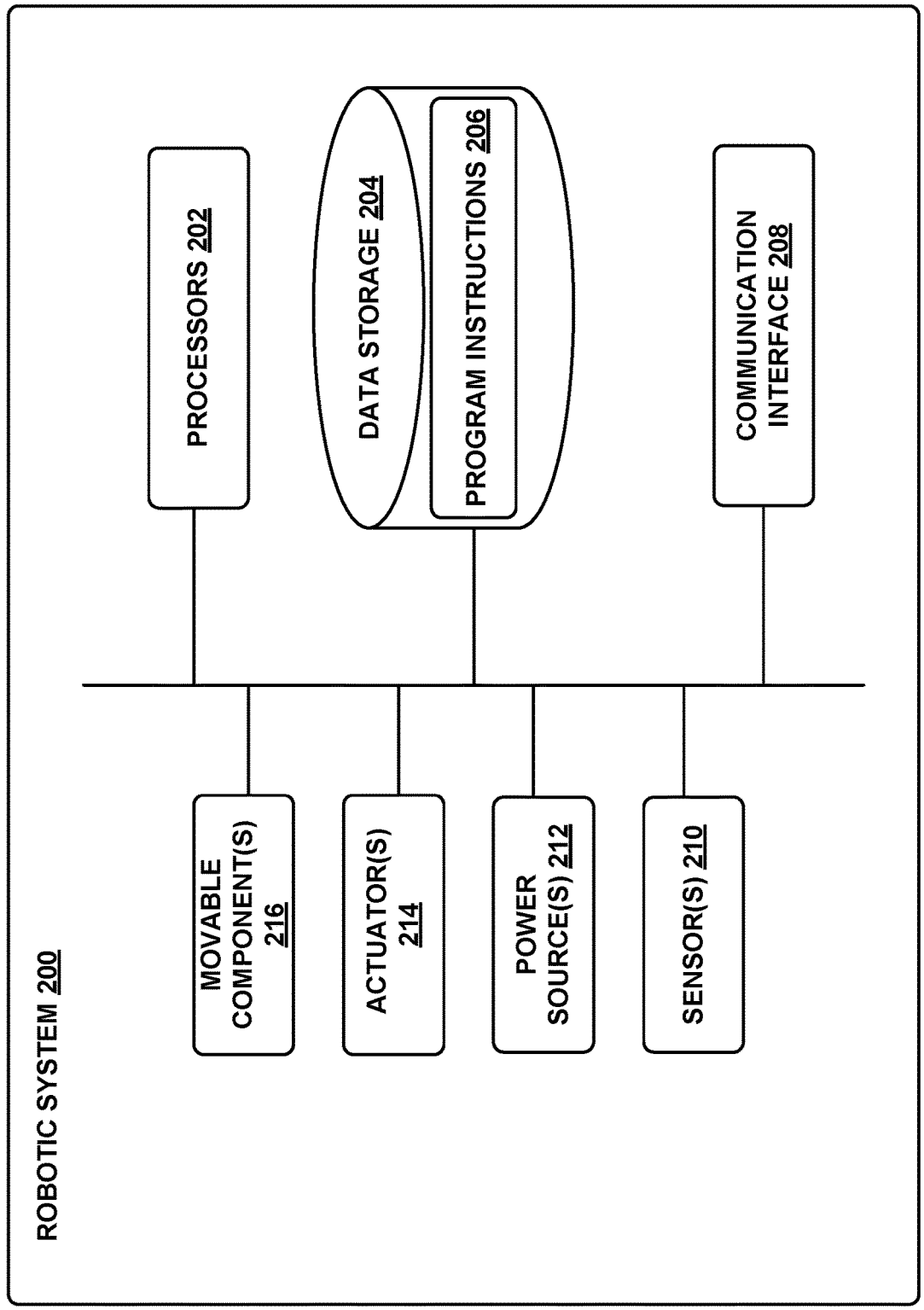
FIG. 2 is a simplified block diagram illustrating components of a robotic system, according to an example implementation.

FIG. 2 next shows an example configuration of a robotic system 200. The robotic system 200 may be a robotic arm, a mobile platform, a mobilized robotic arm, a humanoid robot, a quadrupedal robot, or any type of automated fabrication machinery, among other examples. Additionally, the robotic system 200 may also be referred to as a robotic device, robotic manipulator, or robot, among others.

The robotic system 200 is shown to include processors 202, data storage 204, program instructions 206, communication interface 208, sensor(s) 210, power source(s) 212, actuator(s) 214, and movable component(s) 216. Note that the robotic system 200 is shown for illustration purposes only as robotic system 200 may include additional components and/or have one or more components removed without departing from the scope of the invention. Further, note that the various components of robotic system 200 may be connected in any manner.

Yet further, the above description of processors 102, data storage 104, program instructions 106, and communication interface 108 may apply to any discussion below relating to the respective component being used in another system or arrangements. For instance, as noted, FIG. 2 illustrates processors, data storage, program instructions, and a communication interface as being incorporated in another arrangement. These components at issue may thus take on the same or similar characteristics (and/or form) as the respective components discussed above in association with FIG. 1. However, the components at issue could also take on other characteristics (and/or form) without departing from the scope of the disclosure.

In practice, the robotic system 200 may include one or more sensor(s) 210 such as force sensors, proximity sensors, motion sensors, load sensors, position sensors, touch sensors, depth sensors, ultrasonic range sensors, and infrared sensors, among other possibilities. The sensor(s) 210 may provide sensor data to the processors 202 to allow for appropriate interaction of the robotic system 200 with the environment. Additionally, the robotic system 200 may also include one or more power source(s) 212 configured to supply power to various components of the robotic system 200. Any type of power source may be used such as, for example, a gasoline engine or a battery.

Further, as noted, the robotic system 200 may also include one or more actuator(s) 214. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 200). In other cases, an actuator may be a linear actuator that may be used in systems involving straight line motion. In either case, actuator(s) 214 may cause movement of various movable component(s) 216 of the robotic system 200. The moveable component(s) 216 may include appendages such as robotic arms, legs, and/or hands, among others. The moveable component(s) 216 may also include a movable base, wheels, and/or end effectors, among others.

Figure 3:
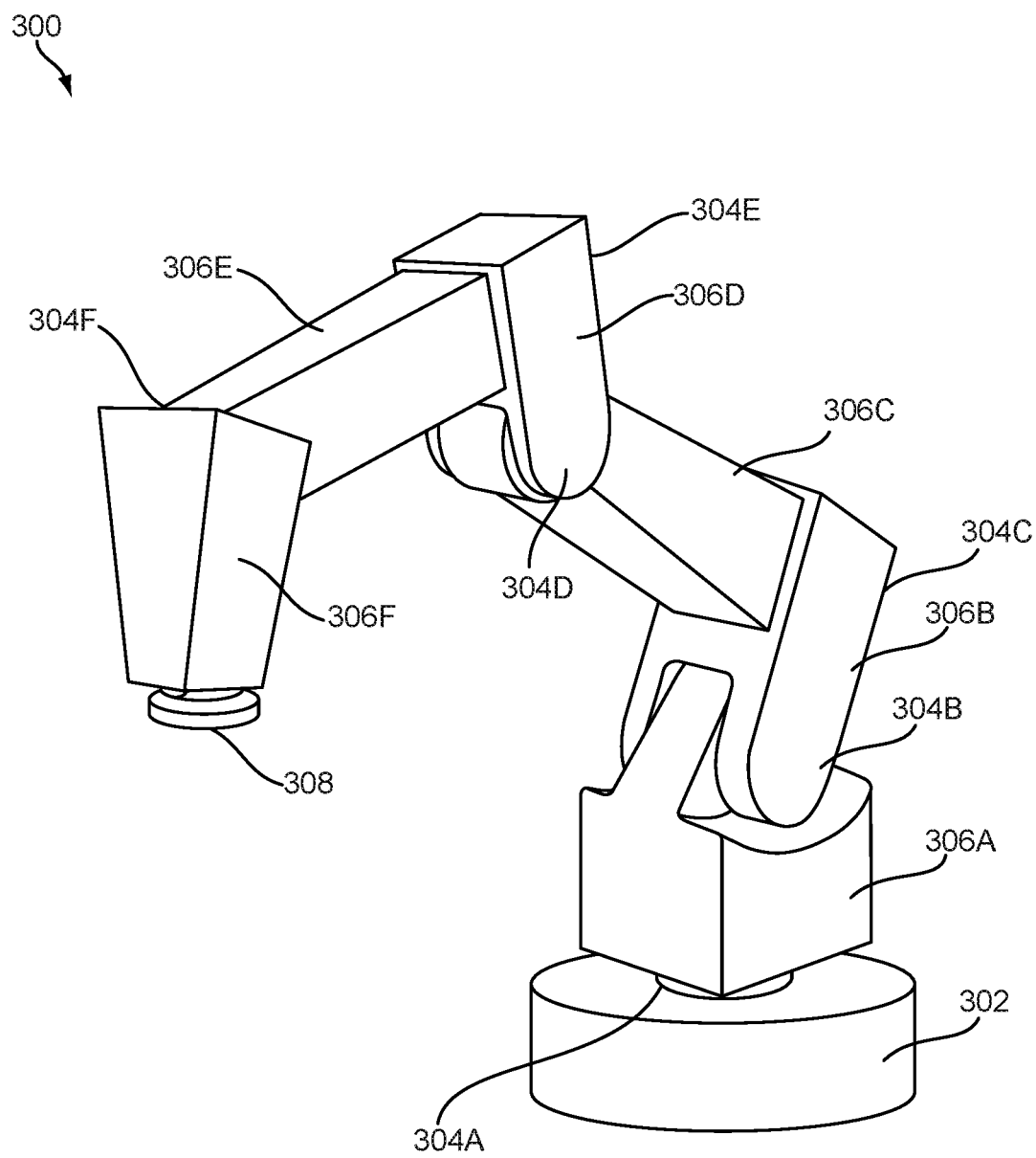
FIG. 3 illustrates a robotic arm, according to an example implementation.

A robotic system 200 may take on various forms. To illustrate, refer to FIG. 3 showing an example robotic arm 300. As shown, the robotic arm 300 includes a base 302, which may be a stationary base or may be a movable base. In the case of a movable base, the base 302 may be considered as one of the movable component(s) 216 and may include wheels (not shown), powered by one or more of the actuator(s) 214, which allow for mobility of the entire robotic arm 300.

Additionally, the robotic arm 300 includes joints 304A-304F each coupled to one or more of the actuator(s) 214. The actuators in joints 304A-304F may operate to cause movement of various movable component(s) 216 such as appendages 306A-306F and/or end effector 308. For example, the actuator in joint 304F may cause movement of appendage 306F and end effector 308 (i.e., since end effector 308 is coupled to appendage 306F). Further, end effector 308 may take on various forms and may include various parts. In one example, end effector 308 may take the form of a gripper such as a finger gripper or a suction gripper. In another example, the end effector may include sensors such as force sensors, location sensors, and/or proximity sensors. In yet another example, end effector 308 may take the form of a tool, such as a fabrication tool. Other examples may also be possible.

Given this arrangement, a robotic system 200, such as robotic arm 300 or any other machinery, may assist with or otherwise carry out production of structure(s). In particular, as noted, the robotic system 200 may have one or more fabrication tools and the robotic system 200 may use one or more of those fabrication tools to fabricate a structure, such as through additive and/or subtractive manufacturing, among other options. These fabrication tools may include a cutter, a slitter, a drill, a saw, a blade, and/or a polisher, among others. Additionally, the robotic system 200 may receive production instructions (e.g., from computing system 100) in accordance with which the robotic system 200 may fabricate or otherwise produce a structure. These instructions may specify a tool to be used, a feature of the structure to be added, a feature of the structure to be removed, a feature of the structure to be adjusted, and/or an order of fabrication, among any other feasible instructions. Other arrangements are also possible.

C. Environment for Design and Production of a Structure

Figure 4:
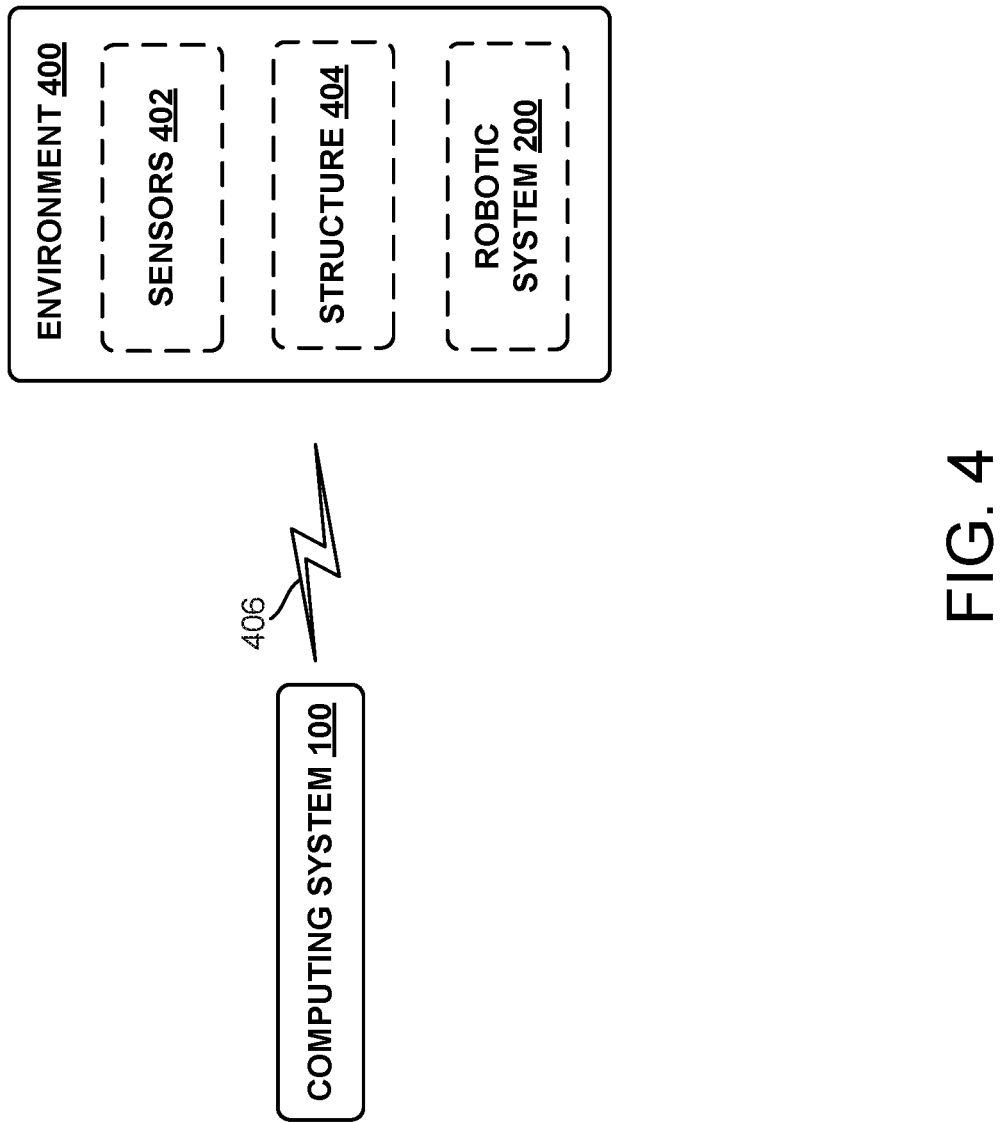
FIG. 4 is a simplified block diagram illustrating features of a structure design and production environment, according to an example implementation.

FIG. 4 next shows an environment 400 that has one or more sensors 402, and in which a structure 404 being produced and possibly also the robotic system 200 may be found. And although the computing system 100 is shown to be outside of the environment 400, the computing system 100 could additionally or alternatively be within the environment 400.

Generally, the environment 400 may define at least one physical space in which people, objects, and/or machines may be located. Thus, the environment 400 may take on a two-dimensional (2D) or a three-dimensional (3D) form and may be used for various purposes. For example, the environment 400 may be a manufacturing facility where the fabrication and/or manufacturing of structures is carried out. In other examples, the environment 400 may be a distribution facility, an office space, a shopping center, and/or, a living space, among various other examples.

In some arrangements, the environment 400 may be a single physical space in which both design and production of the structure take place. In such arrangements, a single space may thus include both a design environment for structure design and a production environment (could also be referred to as a work site) for production of the structure. In practice, structure design may be defined as any actions taken to result in a model of a desired structure, which may indicate how the structure will be configure and/or how the structure will function once it is produced. Generally, the structure design may occur before a robotic system 200 begins producing the desired structure. But structure design could also occur during production of a desired structure. Furthermore, structure production may be defined as any actions taken to physically create a desired structure. Generally, such structure production may start when a first permanent physical change is made, such as a first cut, a first etch, or a first material addition, among others.

In other arrangements, the environment 400 may be at least two physical spaces, perhaps one of which may be used as a design environment for structure design and the other may be used as a work site for production of a structure. In such arrangements, each physical space may respectively include any combination of the above-mentioned components and/or entities. Various other arrangements are also possible.

Sensors 402 in the environment 400 may include but are not limited to: force sensors, proximity sensors, motion sensors (e.g., an inertial measurement units (IMU)), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others. Moreover, the sensors 402 may be positioned within or in the vicinity of the environment 400, among other options.

Further, one or more of these sensors 402 could be incorporated within existing devices and/or systems. In one example, these devices and/or systems may be those in possession of user(s) located in the environment 400, such as mobile phones, laptops, and/or tablets, among others. In another example, one or more of these sensors 402 may be one or more of the sensors 210 of the robotic system 200. Other examples are also possible.

As further shown in FIG. 3, the computing system 100 may be in communication with the various entities found in the environment 400 via at least one communication link 406. This communication link 406 may be a wired or a wireless communication link. More specifically, a wired link may include, for example, a parallel bus or a serial bus such as a Universal Serial Bus (USB). Whereas, a wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11). In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

As such, the computing system 100 may be in communication with sensors 402 and may thus receive (e.g., continuously or periodically) sensor data from one or more of the sensors 402. In practice, this sensor data may take the form of one or more data packets and may provide environment information representative of the environment 400. Additionally, the computing system 100 may be in communication with the robotic system 200. In this way, the computing system 100 may transmit to the robotic system 200 instruction(s) with production of the desired structure 404. For example, an instruction may direct the robotic system 200 to produce the desired structure 404 in accordance with model data representative of the structure 404. Moreover, the computing system 100 may receive communications from the robotic system 100, such as sensor data and/or communications specifying production progress, among other options. Other examples are also possible.

In practice, the structure 404 being produced may include one or more physical pieces each respectively made of at least one material. Specifically, these piece(s) may be worked on to produce the desired structure 404, such as by being cut, added together, and/or shaped into the desired structure by one or more tools. By way of example, the structure 404 being produced could include a piece of metal and a piece of wood that could be added together and/or respectively shaped, among other possibilities. In practice, the robotic system 200 discussed above may be configured to carry out production of the desired structure, such as by using one or more of the tools described above for instance.

Moreover, the shape of the desired structure 404 (and perhaps other aspects of the production process) may be determined based on model data (and/or other forms of data). For example, in-line with the discussion above, the computing system 100 may be configured to receive input from a user, such as via a graphical user interface (GUI) for instance. This input may be representative of a respective target shape of each piece of the desired structure 404, of a respective target size of each piece of the desired structure 404, of a respective target position of each piece of the desired structure 404, of a respective target orientation of each piece of the desired structure 404, among others. In this manner, the computing system 100 may ultimately receive model data based on which the desired structure 404 is to be produced and may receive such model data before and/or during production of the desired structure 404. Moreover, the computing system 100 may be able to display the model of the structure, such as via the GUI.

Given this, the model may represent various features of the structure. Generally, each such feature may be a distinctive attribute or aspect of the structure. By way of example, a feature of a structure may be a surface of a table, legs of the table, and/or cup holders formed on the surface of the table, among other possibilities.

Additionally, each feature of the structure may be respectively defined by one or more parameters. In particular, a parameter may be any numerical or other measurable factor that helps define a feature of the structure and/or conditions of the structure's operation. Furthermore, each parameter may have a respective value that explicitly defines the manner in which a respective feature should be produced. For example, a leg of a table may be defined by the parameter of length and that length may have a value (e.g., five meters (5 m)) explicitly defining the length of the table's leg and/or the length that the leg should have. As such, the model of the structure may specify one or more parameters for one or more features as well as a respective value for each such parameter, so that the structure is then produced to in accordance with those specifications.

In practice, various parameters could be feasibly specified in a model for a structure and/or otherwise exhibited by the structure when it is produced or being produced. Although some parameters are discussed herein by way of example, it should be understood that other parameters are possible as well without departing from the scope of the present disclosure. For instance, other parameters may include any of those that could be specified in currently-known and/or future developed computer-aided design (CAD) software (e.g., concentricity), among others.

In one case, a parameter may be a position of a feature of the structure. In one example, the position could be defined by a coordinate value relative to a coordinate system. In another example, the position could be defined by a distance value indicating a distance to a point in physical space and/or a point on the structure, among others. In yet another example, the position could be defined by a spatial vector indicating both magnitude (e.g., distance) and direction in physical space (e.g., a direction that the feature should face).

In another case, a parameter may be an orientation of a feature of the structure. In one example, the orientation could be defined by an angle value indicating an angle of the feature relative to another. For instance, the orientation could be defined by an indication of parallelism or perpendicularity to another feature.

In yet another case, a parameter may be a material property of a feature of the structure. For example, a material property could be defined by a value or other indication of material density, curvature, material strength, size, shape, conductivity, temperature, and/or color, among others.

In yet another case, a parameter may be an attribute of an interaction with a feature of the structure. For example, an attribute of an interaction could be defined by a force value indicating a force that was applied and/or should be applied to the feature. In another example, an attribute of an interaction could be defined by a pressure value indicating a pressure that was applied and/or should be applied to the feature. In yet another example, an attribute of an interaction could be defined by an indication of an approach for moving the feature (e.g., turn a knob clockwise versus counterclockwise during production of the structure). In yet another example, an attribute of an interaction could be defined by an indication of a movement characteristic that the feature should exhibit, such as by a maximum speed at which the feature is to be able to rotate. Other cases and examples are also possible.

Figure 5:
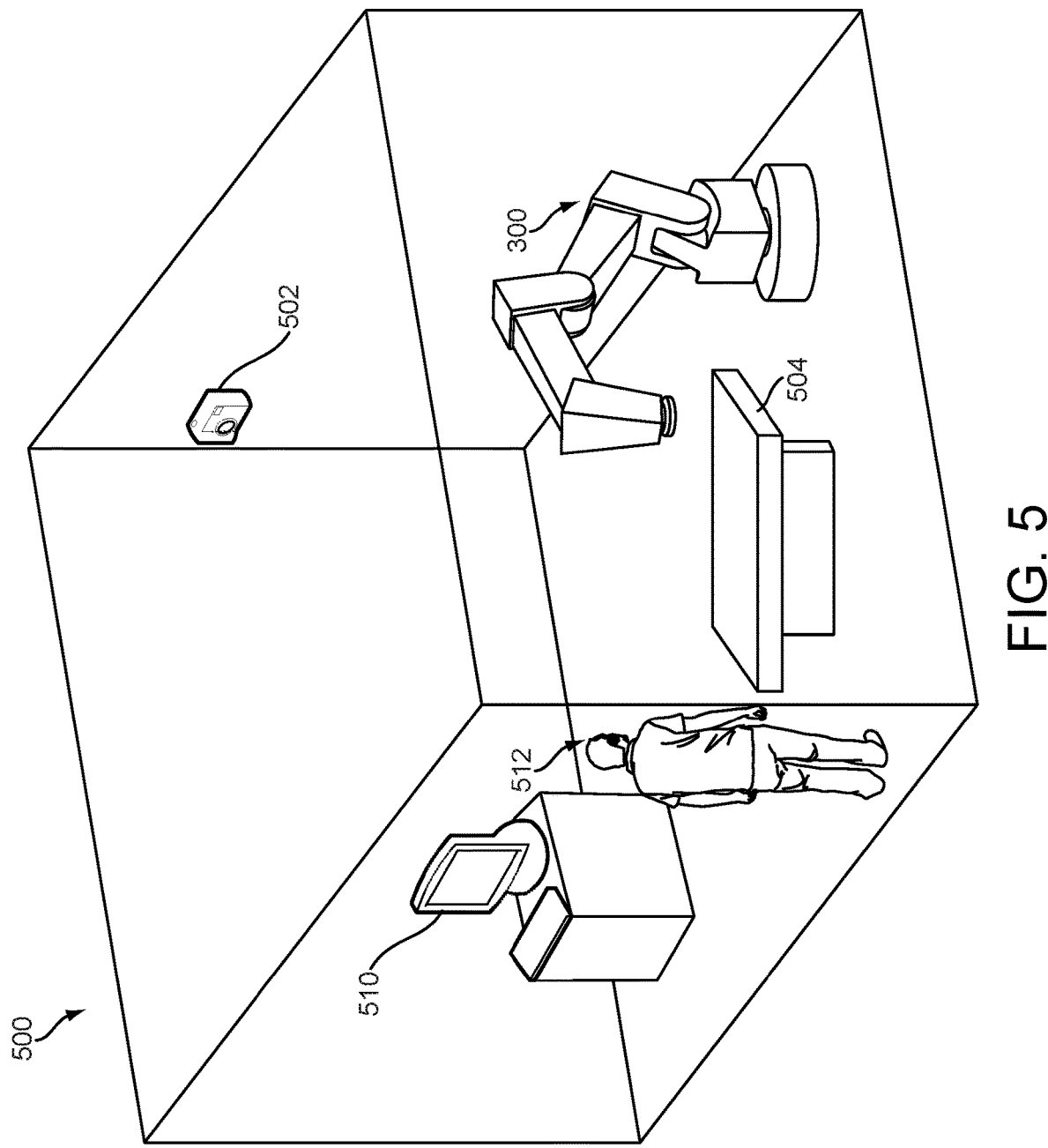
FIG. 5 illustrates a structure design and production environment, according to an example implementation.

FIG. 5 next illustrates an example environment 500 that may be used as both a structure design environment as well as a structure production environment. As shown, the environment 500 includes the robot arm 300, an example sensor 502, a structure 504 being produced, and an example computing system 510. Further, FIG. 5 shows that the structure 504 is at least partially produced and thus that production of the structure 504 is in-progress. Yet further, FIG. 5 shows that a user 512 is also located within the environment 500.

In an example scenario, the structure 504 may be designed via the computing system 510, such as by the user 512 and/or in other ways, so that the robot arm 300 could then produce structure 504 based on the design. For example, the user 412 may design a table having several features, such as legs, a surface, and/or cup holder(s) formed thereon. As such, the robot arm 300 may produce the structure 504 in accordance with model data representative of the designed table. Other examples and illustrations are also possible.

Figure 6:
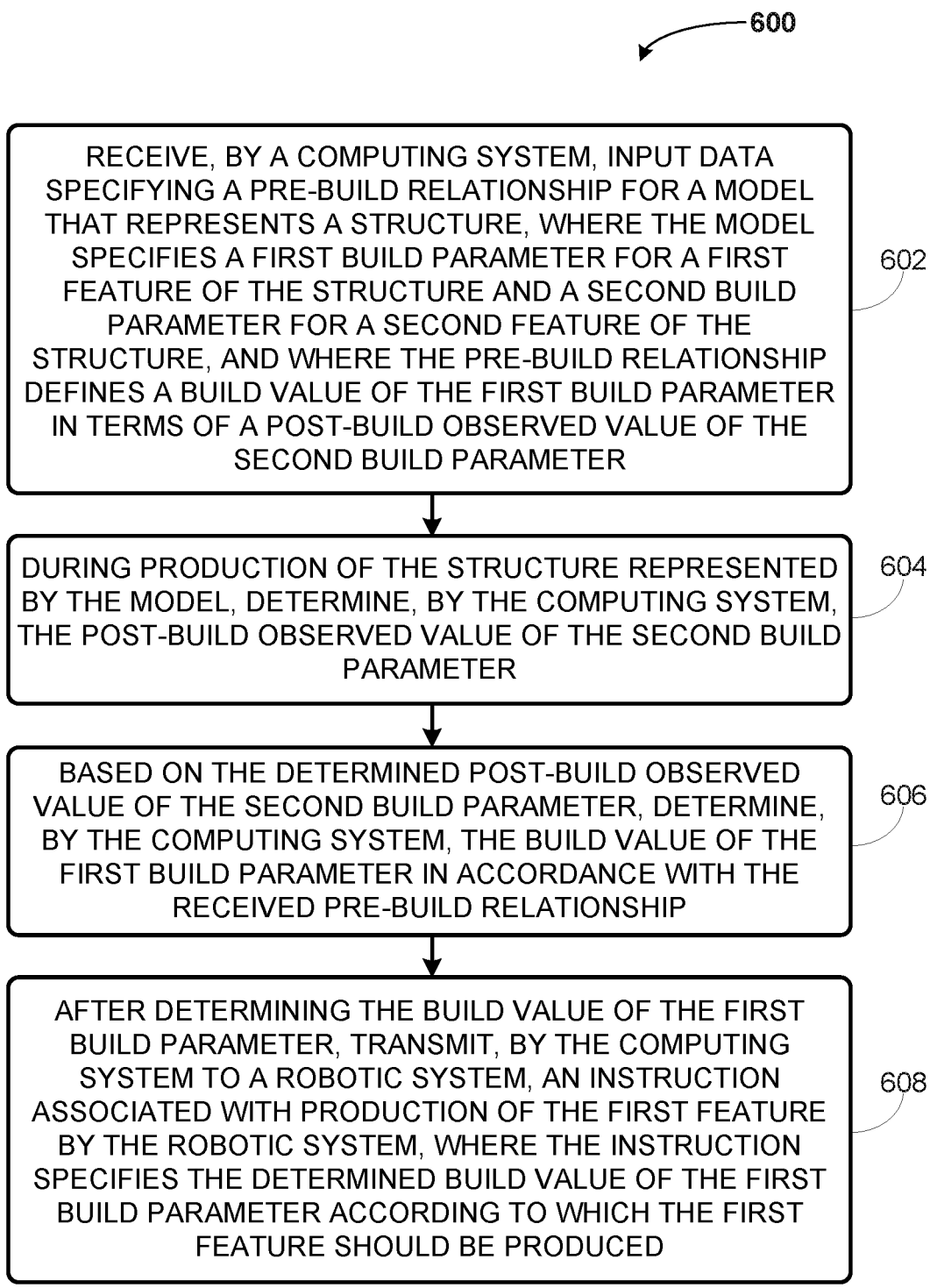
FIG. 6 illustrates an example flowchart for establishing and maintaining a pre-build relationship, according to an example implementation.

III. Illustrative Methods for Defining and Maintaining a Pre-Build Relationship FIG. 6 is next a flowchart illustrating a method 600, according to an example implementation. Illustrative methods, such as method 600, may be carried out in whole or in part within an arrangement involving, for example, the computing system 100 of FIG. 1, the robotic system 200 of FIG. 2, and/or the environment 400 of FIG. 4 (or more particularly by one or more components or subsystems thereof, such as by a processor and a non-transitory computer-readable medium having instructions that are executable to cause a system to perform functions described herein). However, it should be understood that example methods, such as method 600, may be carried out by other entities or combinations of entities as well as in other arrangements, without departing from the scope of the disclosure.

Method 600 and other processes and methods disclosed herein may include one or more operations, functions, or actions as illustrated by one or more of blocks 602-608 for instance. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves receiving, by a computing system, input data specifying a pre-build relationship for a model that represents a structure, where the model specifies a first build parameter for a first feature of the structure and a second build parameter for a second feature of the structure, and where the pre-build relationship defines a build value of the first build parameter (also referred to herein as a "first parameter") in terms of a post-build observed value of the second build parameter (also referred to herein as a "second parameter"). Generally, a pre-build relationship could also be referred to as a pre-build constraint, among other possibilities.

As discussed above, existing modeling environments provide the capability of implicitly defining a relationship between parameters of a structure. But such an implicitly defined relationship is not always maintained during build time. To help overcome this issue, disclosed herein are various implementations for defining explicit relationship(s) between parameters of a structure before the structure is fully produced, such that those relationship(s) are maintained during build time. As such, a computing system may receive input data indicating a pre-build relationship, which the computing system may receive in any feasible manner, such as via an IME (e.g., IME 112), among other options.

In this regard, the computing system may prioritize the received pre-build relationship during build time over individual value(s) of those parameters. And in doing so, the computing system may be able to increase the probability that the relationship is substantially maintained even if a particular one of those parameters ends up having a corresponding value other than a value specified in the model for the structure.

In particular, the pre-build relationship may define a build value of a first parameter in terms of or otherwise relative to a post-build observed value of the second parameter. In accordance with the present disclosure, the post-build observed value may be a value that is yet to be determined, but will be determined during production of the structure as further described below. Whereas, the build value is a value defined in terms of or otherwise relative to the post-build observed value and thus will be explicitly defined once the post-build observed value is determined as further described below. In this way, if the post-build observed value of the second parameter end up being different from a "planned" value that the model specified the second parameter should have, the build value of the first parameter would still ultimately be defined in accordance with the pre-build relationship so that this relationship is exhibited by the structure once it is produced.

Furthermore, the pre-build relationship could be a relationship defined for any feasible combination of features and/or parameters. In one case, the first and second features at issue could be the same feature. In this case, the pre-build relationship may be a relationship between different parameters of the same feature. For example, the pre-build relationship may be a relationship between a position of a table's leg and an orientation of the table's leg. In another case, however, the first and second features at issue could be different features of the same structure. In this case, the pre-build relationship may be a relationship between the same parameter of different features. For example, the pre-build relationship may be a relationship between a position of a table's first leg and a position of a table's second leg. Alternatively, the pre-build relationship may be a relationship between different parameters of different features. For example, the pre-build relationship may be a relationship between an orientation of the table's first leg and a size of the table's second leg. Other cases/examples are also possible.

In a system arranged as described above, the first and second parameters could each respectively be any one of the parameters described herein, among others. For example, the first parameter may be a position of the first feature, an orientation of the first feature, a material property of the first feature, and/or an attribute of an interaction with the first feature, among others. Similarly, the second parameter may be a position of the second feature, an orientation of the second feature, a material property of the second feature, and/or an attribute of an interaction with the second feature, among others.

Given this, various types of pre-build relationship(s) are possible and thus the computing system could receive input data indicating any one of these relationship(s). By way of example, a pre-build relationship may define a build value of pressure to be applied to a feature in terms of a post-build observed value of a density of that feature. In this way, once the post-build observed value of the density is determined, the computing system could then determine the build value of the pressure, so that pressure having that build value is applied to that feature during production of the structure. Other examples are also possible.

Although various types of pre-build relationship(s) are possible, for sake of simplicity, the present disclosure is often described herein in the context of a positional relationship. In particular, assuming that the first parameter is a first position of the first feature and that the second parameter is a second position of the second feature, then the pre-build relationship could be a positional relationship that defines a build value of the first position in terms of a post-build observed value of the second position. In this way, once the post-build observed value of the second position is determined, the computing system could then determine the build value of the first position, so that the first feature could then be produced in a position having that build value, thereby maintaining the positional relationship.

Generally, the positional relationship could be defined in various ways. In one example, a positional relationship may define a relative distance value between the first and second features, so that a particular defined distance is substantially maintained between those features regardless of the position that any individual one of those feature ends up exhibiting (e.g., within a threshold error as further described below). In another example, a positional relationship may include one or more coordinate value relationships. For instance, a first coordinate value relationship may define that, if the post-build observed value of the second position is a coordinate value of "A", then the build value of the first position should be a coordinate value of "B". And a second coordinate value relationship may define that, if the post-build observed value of the second position is a coordinate value of "C", then the build value of the first position should be a coordinate value of "D", and so on. In this way, the coordinate value of the first position may change depending on the actual coordinate value of the second position. Other examples are possible as well.

Figure 7A:
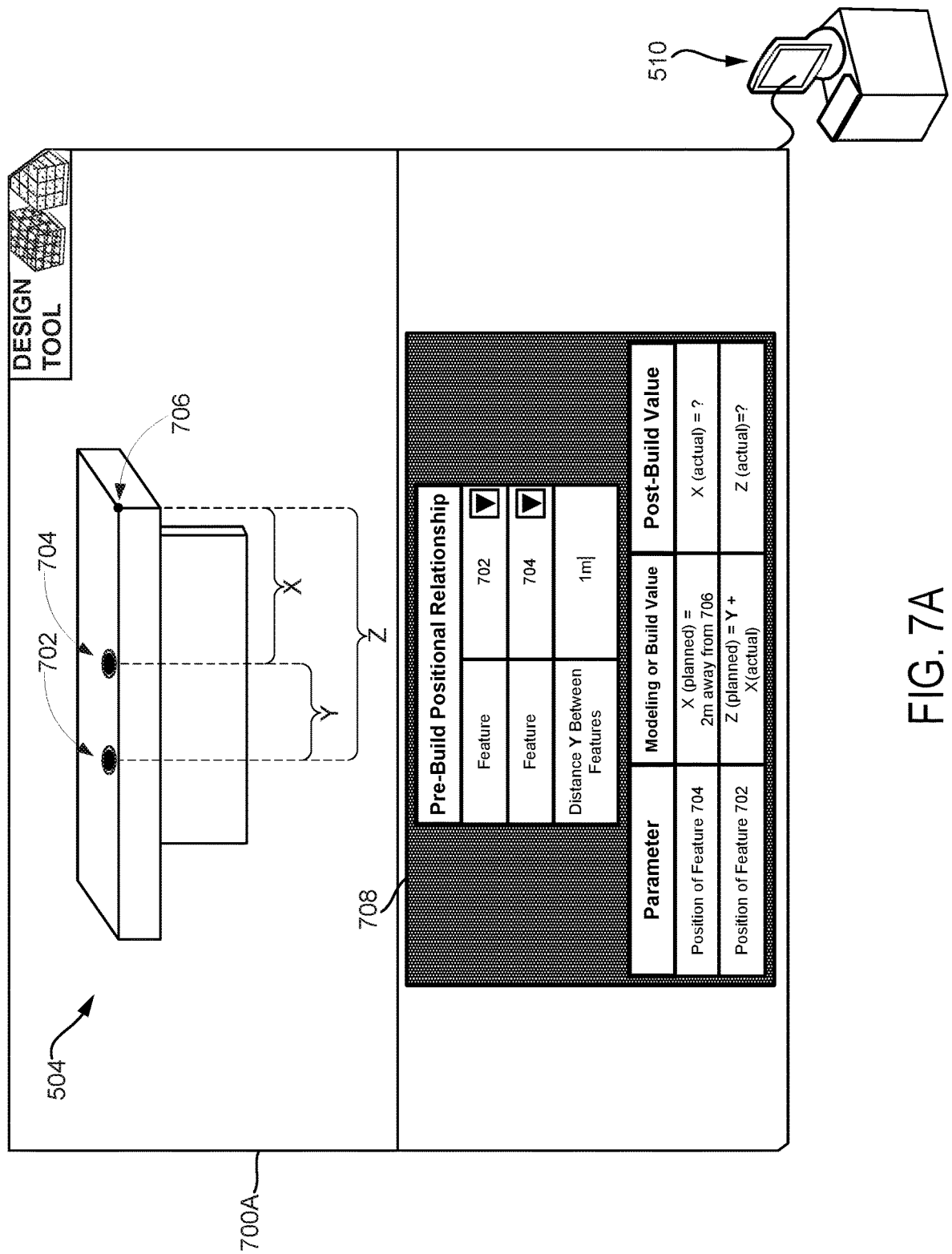
FIG. 7A to 7E illustrates a scenario for defining and maintaining a pre-build positional relationship, according to an example implementation.

FIG. 7A next illustrates a GUI through which the computing system 510 may receive a pre-build relationship. More specifically, in a state 700A of the GUI, the GUI displays a model of the structure 504 being produced or to be produced. In-line with the discussion above, that structure 504 could be a table having several features, such as legs, a surface, and cup holder 702 and 704 formed on the surface. Furthermore, the computing system 510 may receive, via interface feature 708, input data specifying values of parameters of the structure 504 and/or specifying pre-build relationship(s), such as a positional relationship.

In particular, the model specifies a modeling value of a position "X" of cup holder 704, which is specified relative to a reference point 706 on the table. As shown, the modeling value of position X has been set to a value of 2 m away from reference point 706. Additionally, the model specifies a build value of a position "Z" of cup holder 702, which is also relative to a reference point 706 on the table. In this case, however, the build value of position Z is defined in terms a post-build observed value of position X, which is yet to be determined. Specifically, a pre-build positional relationship may be defined via interface feature 708 through selection of the features for which a positional relationship is to be established as well as through entry of a distance that should be maintained between respective positions of those features. As such, interface feature 708 shows that a positional relationship has been defined such that a distance "Y" of 1 m is maintained between cup holder 702 and cup holder 704 and thus the build value of position Z is determined through computation of a formula including addition of the distance Y to the post-build observed value of position X. Other illustrations are also possible.

At block 604, method 600 then involves, during production of the structure represented by the model, determining, by the computing system, the post-build observed value of the second build parameter.

In-line with the discussion above, after the computing system receives the input data specifying the pre-build relationship, the computing system may then determine the post-build observed value of the second parameter, so that the computing system could ultimately determine the build value of the first parameter. In practice, the computing system may determine the post-build observed value upon a determination that the second parameter of the second feature has been produced, which could be made by monitoring progress of structure production using currently known and/or future developed techniques. For example, the computing system may make a determination that a table's leg has been cut to a certain length and, upon making that determination, may responsively determine that length's value. Alternatively, the computing system may determine the post-build observed value at other times.

Nonetheless, the computing system may determine the post-build observed value in various ways. For example, the computing system may receive sensor data from one or more sensor, such as from sensor(s) of a robotic system (e.g., sensor(s) 210) and/or from other sensor(s) in the environment of the structure being produced (e.g., sensor(s) 402). In this example, the computing system may then determine the post-build observed value based on the received sensor data. For instance, the computing system may receive position data from a position sensor and may then use that position data as basis for determining a value of a position of the second feature. In another example, the robotic system may carry out the step of determining the post-build observed value based on the sensor data (e.g., from sensor(s) of the robotic system and/or other sensor(s)). And the computing system may then receive that determined post-build observed value from the robotic system, which could occur automatically and/or upon request. Other examples are also possible.

Figure 7B:
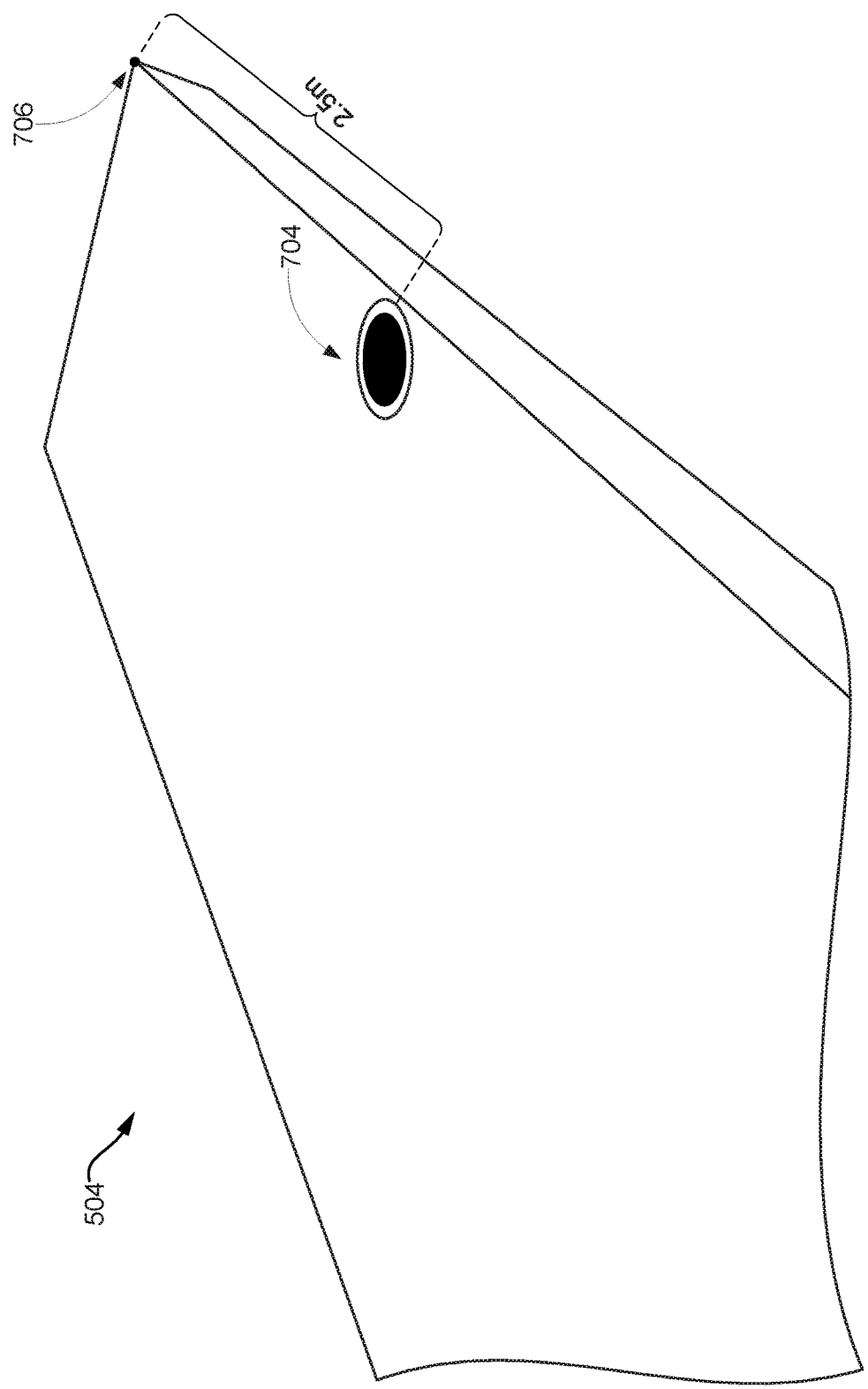

FIG. 7B next illustrates a post-build observed value that a computing system may determine in accordance with the present disclosure. In particular, FIG. 7B shows that the structure 504 taking the form of a table has been at least partially produced. As shown, the cup holder 704 has been formed on the surface of the table at a position X having a value of 2.5 m away from reference point 706. As such, the computing system may determine the post-build observed value of the position X to be 2.5 m, which is different from the modeling value of position X that was set to a value of 2 m away from reference point 706. Other illustrations are also possible.

At block 606, method 600 then involves, based on the determined post-build observed value of the second build parameter, determining, by the computing system, the build value of the first build parameter in accordance with the received pre-build relationship.

In-line with the discussion above, once the computing system determines the post-build observed value, the computing system may then use that determined post-build observed value of the second parameter as basis for determining the build value of the first parameter in accordance with the pre-build relationship. Generally, the manner in which the computing system determines the build value may depend on the manner in which the pre-build relationship is established.

In one case, the pre-build relationship may be mapping data that maps one or more post-build observed values respectively to one or more build values. In this case, once the computing system determines the post-build observed value, the computing system may refer to the mapping data and use the determined post-build observed value to determine the build value. In particular, when referring to the mapping data, the computing system may determine the build value to which the determined post-build observed value is mapped, and may thus set that determined build value as the value that should be used for the first parameter.

By way of example, referring again to the above-described example of coordinate value relationship(s), these coordinate value relationship(s) could be defined through mapping data. For instance, the mapping data may map the post-build observed coordinate value A to the modeling coordinate value B and may map the post-build observed coordinate value C to the modeling coordinate value D. In this way, as noted above, if the post-build observed value of the second position is determined to be a coordinate value of "A", then the build value of the first position is determined to be a coordinate value of "B" based on the mapping data. And if the post-build observed value of the second position is determined to be a coordinate value of "C", then the build value of the first position is determined be a coordinate value of "D" based on the mapping data. Other examples are also possible.

In another case, the pre-build relationship may be a formula that includes the first and second parameters as variables having unknown values, thereby effectively defining the build value in terms the post-build observed value. In this case, when the computing system determines the post-build observed value, the computing system determines a value for the variable in the formula that corresponds to the second parameter. And given the determined value, the computing system could then compute a value of the variable that corresponds to the first parameter, with that computed value being the determined build value of the first parameter.

Figure 7C:
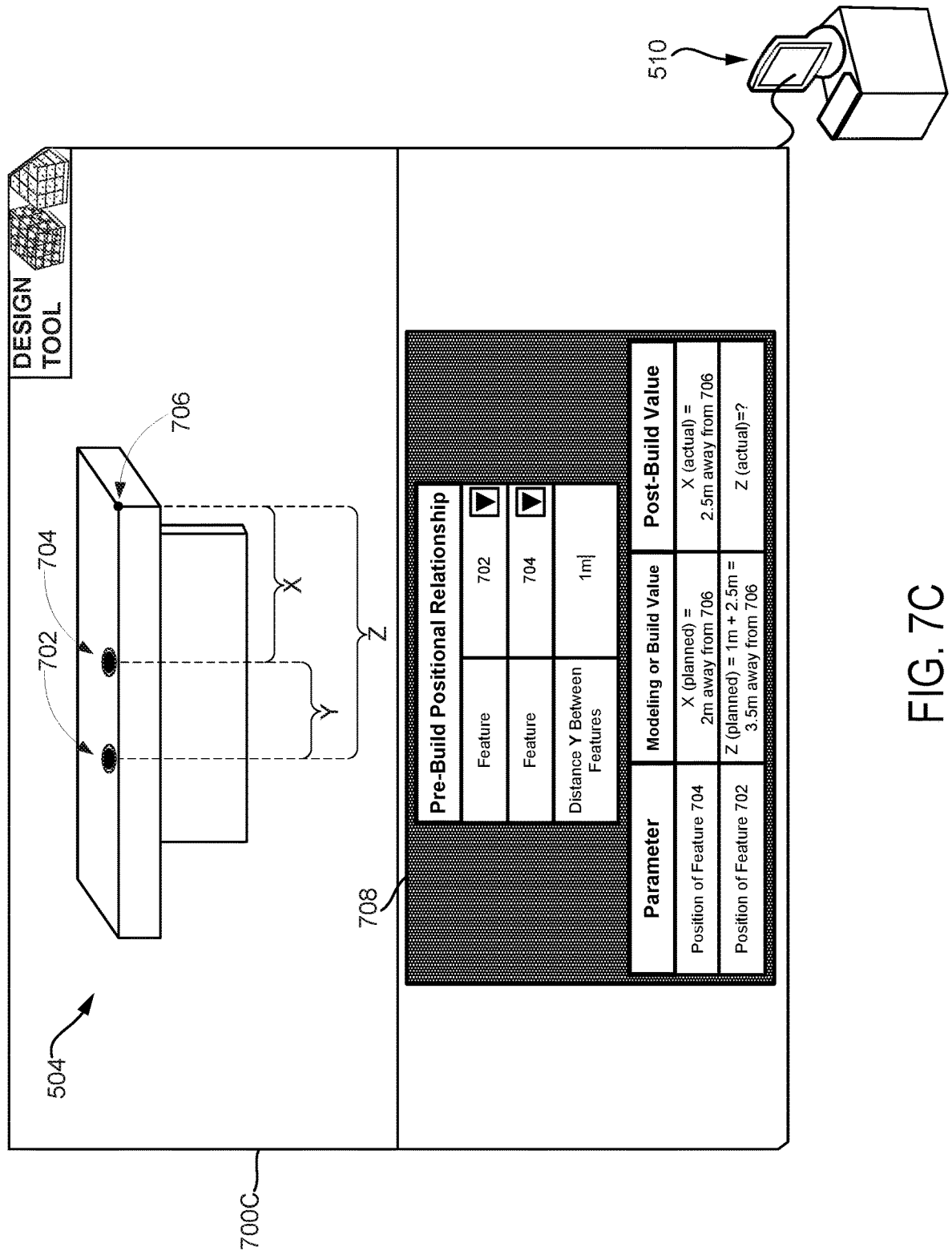

By way of example, FIG. 7C next illustrates a determination of a build value in accordance with a pre-build relationship. In particular, in a state 700C of the GUI, interface feature 708 indicates that the position X has a post-build observed value of 2.5 m away from reference point 706, which is in-line with the determination introduced in FIG. 7B. Moreover, the interface feature 708 shows that the formula representing the received positional relationship has been solved to compute the build value of position Z. More specifically, the interfaces feature 708 shows that the defined distance Y (e.g., 1 m) has been added to the post-build observed value of position X (e.g., 2.5 m away from reference point 706) to result in a determined build value of position Z (e.g., 3.5 m away from reference point 706). In this way, the computing system 510 effectively updates the model so as to help increase the probability that the defined positional relationship is substantially maintained. Other cases, examples, and illustrations are also possible.

At block 608, method 600 then involves, after determining the build value of the first build parameter, transmitting, by the computing system to a robotic system, an instruction associated with production of the first feature by the robotic system, where the instruction specifies the determined build value of the first build parameter according to which the first feature should be produced.

In-line with the discussion above, disclosed are implementations for explicitly defining a relationship between parameters of a structure before the structure is fully produced, such that this relationship is are maintained during build time. As such, once the build value has been determined, the computing system may then facilitate production of the structure such that the received pre-build relationship is substantially maintained. To do so, the computing system may transmit to the robotic system an instruction associated with production of the first feature at issue and that instruction may specify the determined build value.

In one case, the computing system may transmit the instruction to the robotic system upon or otherwise responsive to determining the build value of the first parameter. In another case, however, the computing system may transmit the instruction to the robotic system in response to a request to receive information related to the determined build value and/or to a model that has been updated to specify the determined build value of the first parameter, among others.

In either case, the instruction may specify the determined build value so that the robotic system could then update a locally stored model of the structure to specify that determined build value. In this way, the robotic system could ultimately produce the structure in accordance with the updated locally stored model. Additionally or alternatively, the computing system may update the model to specify the determined build value and thus the instruction may include at least a portion of the updated model that specifies the build value. In this way, the robotic system could ultimately produce the structure in accordance with the received portion of the updated model. Moreover, the instruction may optionally direct the robotic system to actually produce at least the first feature such that the first feature exhibits determined build value for the first parameter. Others cases are possible as well.

Given that the computing system could update the model to specify the determined build value of the first parameter, the computing system may additionally or alternatively update the model to specify other values. For example, the computing system could update the model to specify the determined post-build observed value, such as by replacing a modeling value of the second parameter with the determined post-build observed value. In another example, the computing system may determine a post-build observed value of the first parameter after the first feature is produced to exhibit the determined build value of the first parameter, and may do so using the same or different techniques than those used to determine the post-build observed value of the second parameter. And although the post-build observed value of the first parameter should be substantially the same or similar to the determined build value of the first parameter, the computing system could update the model to specify the determined post-build observed value of the first parameter. Other examples are also possible.

Figure 7D:
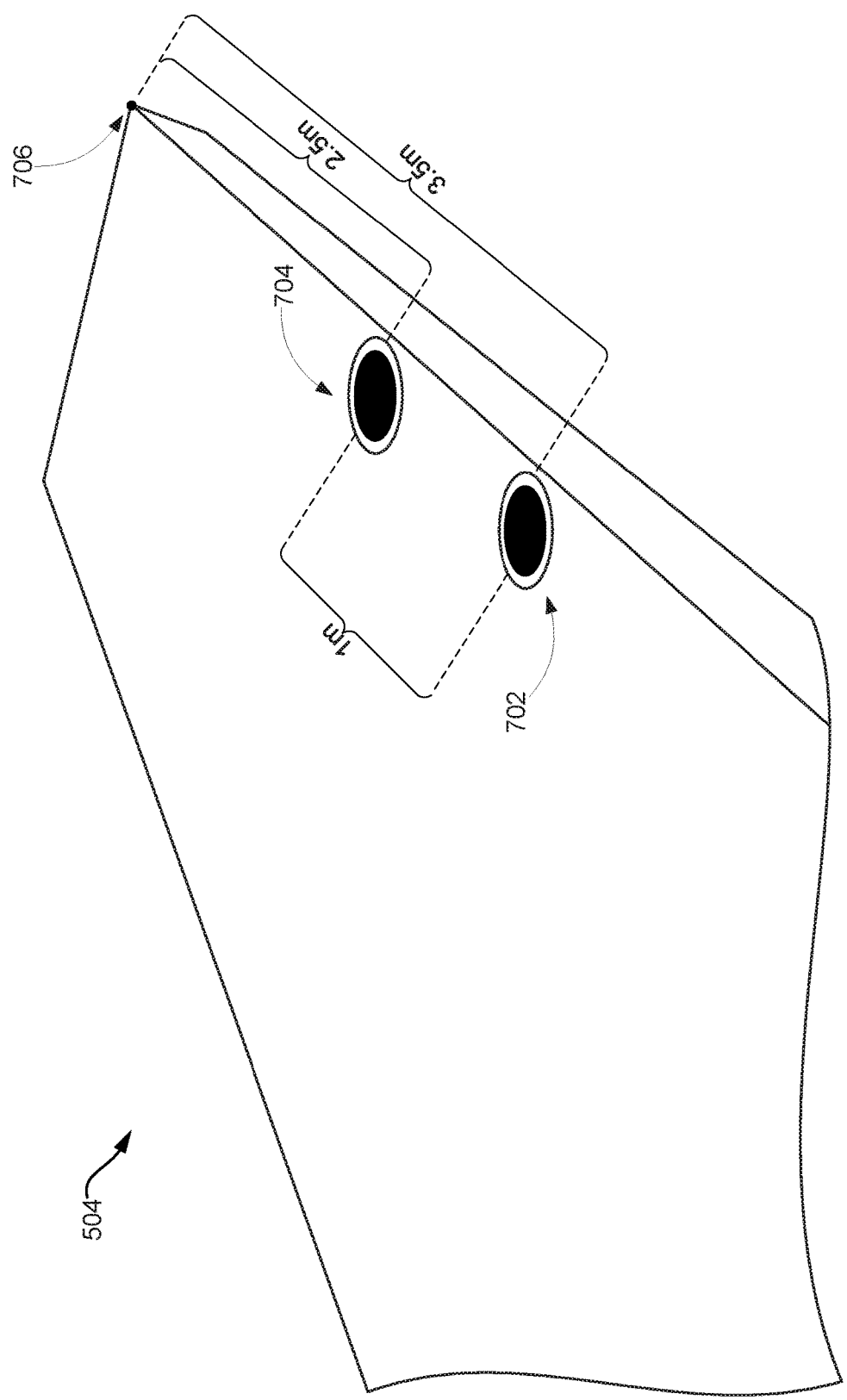

FIG. 7D next illustrates how the received pre-build positional relationship is maintained during production of the structure 504. In particular, FIG. 7D shows that production of the structure 504 has progressed further. As shown, the cup holder 702 has been formed on the surface of the table at a position Z having a value of 3.5 m away from reference point 706, which is a value equivalent to the build value of position Z as determined in-line with the discussion of FIG. 7C. Therefore, as shown, the cup holder 702 has been formed at a position Z that is at the defined distance Y (e.g., 1 m) away from the position X at which cup holder 704 was formed. In this way, the received pre-build positional relationship is maintained despite the actual position X of cup holder 704 being different from the originally planned position X of cup holder 704.

Figure 7E:
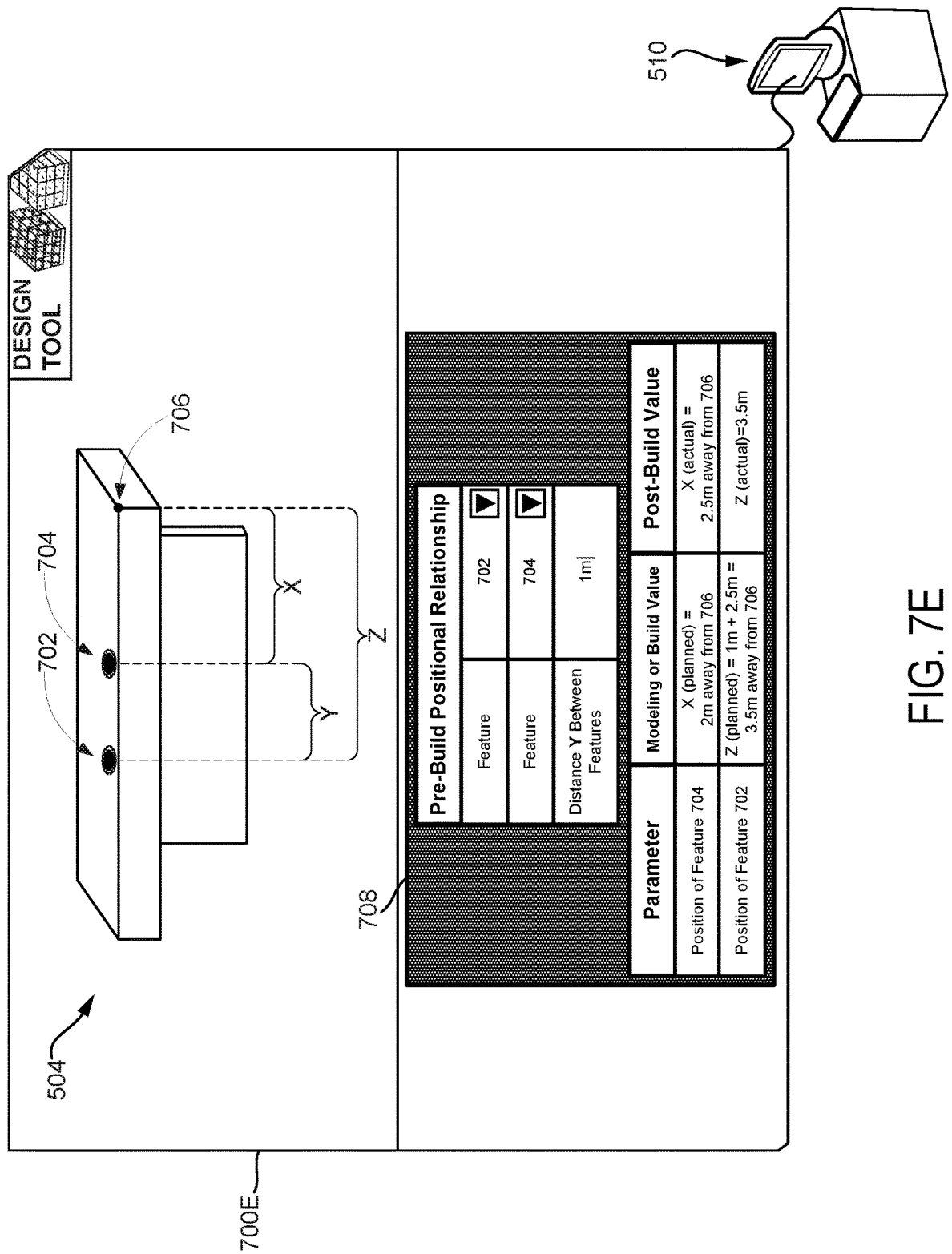

Further, FIG. 7E next illustrates a state 700E of the GUI in which the model has been updated to specify certain values. As shown, in state 700E of the GUI, the interface feature 708 indicated a determined post-build observed value of the position Z of cup holder 702. This determined post-build observed value of the position Z is shown be equivalent to the determined build value of position Z, thereby indicating that the structure 504 has been produced in a manner that maintained the pre-build positional relationship. Other illustrations are possible as well.

Figure 8:
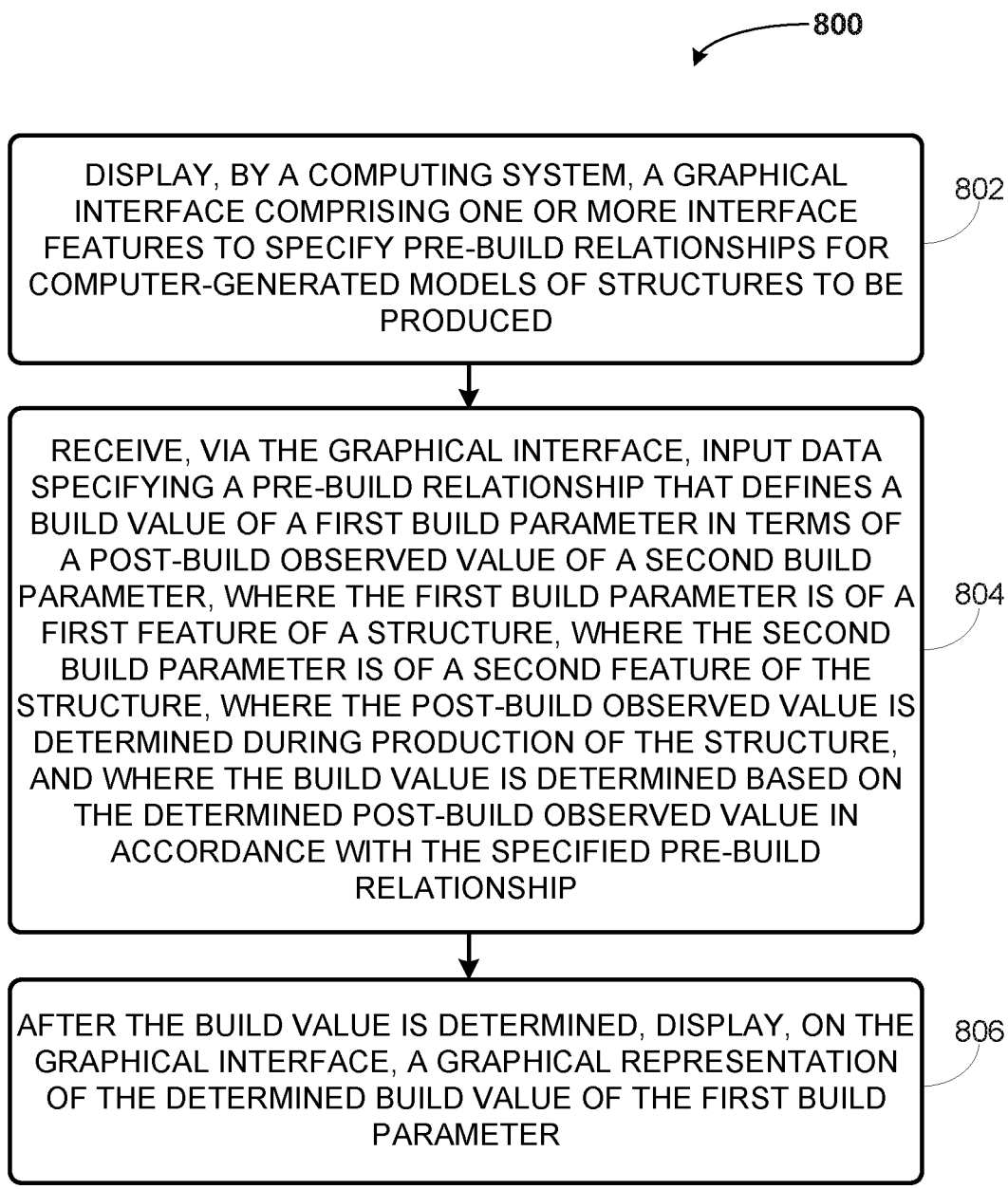
FIG. 8 illustrates an example flowchart for establishing a pre-build relationship via a graphical interface, according to an example implementation.

In a further aspect, disclosed herein is a graphical interface through which the computing system may receive input data defining a pre-build relationship and on which the computing system may display a graphical representation of the determined build value. In this regard, FIG. 8 is next a flowchart illustrating a method 800 for defining a pre-build relationship using a graphical interface, according to an example implementation. Note that any aspects of the present disclosure described in the context of method 600 may also apply in the context of method 800.

At block 802, method 800 involves displaying, by a computing system, a graphical interface comprising one or more interface features to specify pre-build relationships for computer-generated models of structures to be produced.

By way of example, the displayed graphical interface could be arranged to take the form of the GUI shown in FIGS. 7A, 7C, and 7E. Alternatively, the displayed graphical interface could be arranged to take on any other feasible form without departing from the scope of the present disclosure.

At block 804, method 800 then involves receiving, via the graphical interface, input data specifying a pre-build relationship that defines a build value of a first build parameter in terms of a post-build observed value of a second build parameter, where the first build parameter is of a first feature of a structure, where the second build parameter is of a second feature of the structure, where the post-build observed value is determined during production of the structure, and where the build value is determined based on the determined post-build observed value in accordance with the specified pre-build relationship.

By way of example, the computing system may receive the input data via an IME (e.g., IME 112) that allows for interaction with the graphical interface in-line with the discussion above and thus for providing the input data specifying the pre-build relationship. As noted, the IME may be a pointing device such as a computing mouse used for control of the graphical interface. And if the computing system's display device is a touchscreen display, then touch input can be received that allows for control of the graphical interface.

At block 806, method 800 then involves, after the build value is determined, displaying, on the graphical interface, a graphical representation of the determined build value of the first build parameter.

By way of example, once the computing system updates the model, the computing system may display the updated model on the graphical interface. Alternatively, the computing system may display on the graphical interface an indication the determined build value of the first parameter without necessarily displaying the entirety of the updated model. Other examples are also possible.

IV. Additional Features

A. Pre-Build Relationship Specifying Two or More Post-Build Observed Values

In an example implementation, the various aspects of the present disclosure may extend to a scenario in which a computing system receives input data specifying a pre-build relationship that defines a build value in terms of two or more post-build observed values. Although a pre-build relationship could define a build value in terms of three or more post-build observed values, for sake of simplicity, this implementation is described herein in the context of a pre-build relationship that defines a build value in terms of two post-build observed values. As such, assuming that a build value of a first parameter of a first feature is being defined, a pre-build relationship may define that build value in term of (i) a post-build observed value of a second parameter of a second feature and (ii) a post-build observed value of a third parameter of a third feature.

Here again, the pre-build relationship could be a relationship defined for any feasible combination of features and/or parameters. In particular, the first, second, and third features at issue could all be the same feature of a structure or could be different features of the structure. And in some arrangements, two of these features could be the same feature of the structure and the other one of the features could be a feature that is different from that "same" feature. Moreover, the first, second, and third parameters at issue could be the same parameter or could be different parameters. And in some arrangements, two of these parameters could be the same parameter and the other one of the parameter could be a parameter that is different from that "same" parameter. Other cases are also possible.

After the computing system receives the pre-build relationship, the computing system may then determine, during production of the structure, the post-build observed value of the second parameter as well as the post-build observed value of the third parameter. The computing system may determine these post-build observed values at substantially the same time or at different times. Moreover, the computing system may determine each such post-build observed value using any of the techniques described herein, among others.

Once the computing system determines the post-build observed values of the second and third parameters, the computing system may then use these determined post-build observed values as basis for determining the build value of the first parameter in accordance with the pre-build relationship. In-line with the discussion above, the manner in which the computing system determines the build value may depend on the manner in which the pre-build relationship is established.

In one case, the pre-build relationship may be mapping data that maps one or more sets of post-build observed values respectively to one or more build values. In this case, once the computing system determines the set of post-build observed values of the second and third parameters, the computing system may refer to the mapping data and use the determined set of post-build observed values to determine the build value. In particular, when referring to the mapping data, the computing system may determine the build value to which the determined set of post-build observed value is mapped, and may thus set that determined build value as the value that should be used for the first parameter.

In another case, the pre-build relationship may be a formula that includes the first, second, and third parameters as variables having unknown values, thereby effectively defining the build value in terms the post-build observed values. In this case, when the computing system determines the post-build observed values, the computing system determines a value for the variable in the formula that corresponds to the second parameter as well as a value for the variable in the formula that corresponds to the third parameter. And given the determined values, the computing system could then compute a value of the variable that corresponds to the first parameter, with that computed value being the determined build value of the first parameter. Other cases are also possible.

Once the computing system determined that build value of the first parameter, the computing system may transmit to a robotic system an instruction that specifies the determined build value. In this way, the computing system may then facilitate production of the structure such that the received pre-build relationship is maintained. Moreover, in-line with the discussion above, the computing system could update the model at any point in time to specify the determined build value of the first parameter, the determined post-build observed value of the second parameter, the determined post-build observed value of the third parameter, and/or a post-build observed value of the first parameter, among others.

In one example of this implementation, the computing system may receive a pre-build relationship that defines a build value of a position of a table's first cup holder in terms of (i) a post-build observed value of a position the table's second cup holder and (ii) a post-build observed value of a size of the table's surface. In this example, once the computing system determines both of these post-build observed values, the computing system may then use those determined post-build observed values as basis for determining the build value of the position of the table's first cup holder in accordance with the pre-build relationship. In this way, the table could then be produced such that the first cup holder is at a position that maintains an explicit relationship to the position of the table's second cup holder and to the size of the table's surface. Other examples are also possible.

B. Sequence of Pre-Build Relationships

In an example implementation, the various aspects of the present disclosure may extend to a scenario in which a computing system receives input data specifying two or more pre-build relationships that depend on one another. Although the computing system could receive three or more such pre-build relationships that depend on one another, for sake of simplicity, this implementation is described herein in the context of two pre-build relationships that depend on one another. Moreover, for sake of simplicity, this implementation is described herein in the context of each such pre-build relationship defining a build value in terms of a single post-build observed value. It should be understood, however, that this implementation may also apply in the context of one or both of the pre-build relationships define a build value in terms of two more post-build observed values.

As such, a first pre-build relationship may define a build value of first parameter of a first feature in terms of a post-build observed value of a second parameter of a second feature, and a second pre-build relationship may define a build value of a third parameter of a third feature in terms of a post-build observed value of the first parameter. Here again, the first, second, and third features could all be the same feature of a structure or could different features of the structure. And in some arrangements, two of these features could be the same feature of the structure and the other one of the features could be a feature that is different from that "same" feature. Moreover, the first, second, and third parameters could be the same parameter or could be different parameters. And in some arrangements, two of these parameters could be the same parameter and the other one of the parameter could be a parameter that is different from that "same" parameter. Other cases are also possible.

In either case, the first and second pre-build relationships are dependent on one another through the first parameter. In particular, the computing system may first determine the post-build observed value of the second parameter so as to then determine the build value of the first parameter in accordance with the first pre-build relationship. Once the build value of the first parameter is determined, the computing system may send to a robotic system an instruction that specifies the determined build value of the first parameter, so that the first parameter of the first feature is then produced in accordance with that build value. After the first parameter of the first feature is produced, the computing system could then determine the post-build observed value of the first parameter. And once the computing system determines the post-build observed value of the first parameter, the computing system may then finally determine the build value of the third parameter in accordance with the second pre-build relationship and may transmit to a robotic system a further instruction that specifies the determined build value of the third parameter, so that the third parameter of the third feature is then produced in accordance with that build value. In this way, the computing system may increase the probability that multiple explicitly defined relationships are substantially maintained in the structure.

In one example of this implementation, the computing system may receive a first pre-build relationship that defines a build value of a position of a table's first cup holder in terms of a post-build observed value of a position the table's second cup holder, and may receive a second pre-build relationship that defines a build value of a position of a table's third cup holder in terms of a post-build observed value of the position the table's first cup holder.

In this example, the computing system may determine the post-build observed value of the position the table's second cup holder and, based on that determined post-build observed value, the computing system may then determine the build value of the position of a table's first cup holder in accordance with the first pre-build relationship. Once the table's first cup holder is produced in a position that is in accordance with the determined build value, the computing system may determine the post-build observed value of the position of the table's first cup holder, which ideally should be the same or substantially similar to that determined build value. Based on the determined post-build observed value of the position of the table's first cup holder, the computing system may then determine the build value of the position of the table's third cup holder in accordance with the second pre-build relationship, so that the table's third cup holder is produced in a position that is in accordance with that determined build value. In this way, the computing system may increase the probability that multiple explicitly defined positional relationships are substantially maintained in the produced table. Other examples are also possible.

C. Converting an Implicit Relationship to an Explicit Pre-Build Relationship

In an example implementation, a model of a structure may already include an implicit relationship, and the computing system may receive input data (e.g., via a graphical interface) indicating that this implicitly relationship should be defined in the model as an explicit pre-build relationship. In particular, the model may already specify a first modeling value for a first parameter and a second modeling value for a second parameter, and these first and second modeling values may have an implicit relationship with one another. By converting that implicit relationship to an explicit pre-build relationship, the computing system may then carry out operations described herein to increase the probability of substantially maintaining that pre-build relationship, even if a particular one of those parameters ends up having a corresponding post-build value different from a corresponding modeling value specified in the model.

Moreover, the computing system may receive in various ways the input data indicating a conversion of an implicit relationship to an explicit pre-build relationship. In one case, the input data may indicate a selection of the first and second parameters and may include a request to convert an implicit relationship between those parameters into an explicit pre-build relationship that should be substantially maintained. In another case, the computer system may be configured to determine implicit relationships in a model and to display a list of implicit relationship(s), such as a full list of all implicit relationships determined to be in the model and/or a partial list that has been filtered based on search criteria, among other possibilities. In this case, the input data may include a selection of at least one of those displayed implicit relationship(s) as well as a request to respectively convert the selected implicit relationship(s) to explicit pre-build relationship(s). Other cases are also possible.

By way of example, a model may specify a first modeled coordinate value for a position of a first feature as well as a second modeled coordinate value for a position of a second feature. Given these modeled coordinate values, the first and second features may have a certain positional relationship that is implicitly defined in the model, such as an implicitly defined distance between the first and second coordinates for instance. Through conversion of this implicit positional relationship to an explicit positional relationship, the computing system may effectively receive input data specifying a pre-build relationship that defines that distance at issue to be a distance that should be maintained between those first and second features. In this way, even if a particular one of those positions ends up having a corresponding post-build value other than a modeled coordinate value specified in the model, the computing system may increase the probability of the distance between the first and second features being substantially maintained. Other examples are also possible.

D. Error Considerations

In an example implementation, the computing system may consider one or more errors associated with value(s) of parameter(s) as basis for whether or not to prioritize a pre-build relationship over individual value(s) of parameter(s). To facilitate this, the computing system may have stored thereon or otherwise have reference to data specifying a threshold error (could also be referred to as tolerance) associated with a particular parameter, which may be received as input data or establish via manual engineering input, among other options. With this arrangement, the computing system may determine an error associated with the particular parameter and may then make a determination of whether or not the determined error exceeds the threshold error. And based on that determination, the computing system may then determine whether or not to carry out the disclosed process of maintaining the explicitly defined pre-build relationship.

In one example scenario, an error consideration may be with regards to a parameter defined in a received pre-build relationship. In particular, given a pre-build relationship that defines a build value of a first parameter in terms of a post-build observed value of a second parameter, the computing system may determine whether or not to maintain that pre-build relationship based on an error associated with that first parameter.

More specifically, the computing system may determine a build value of the first parameter based on the post-build observed value of the second parameter in-line with the discussion above. And based on the determined build value of the first parameter, the computing system may determine an error associated with the first parameter. In particular, the model may specify a predefined/modeling value of the first parameter, which may be a preliminary value that is given to the first parameter before the build value of the first parameter is determined. But given the pre-build relationship, the determined build value of the first parameter may end up being different from the modeling value of the first parameter if the post-build observed value of the second parameter ends up being different from a modeling value of the second parameter. Thus, the error at issue may be determined based on a comparison of the determined build value of the first parameter to the modeling value of the first parameter.

Generally, determination of the error based on the comparison could take various forms. In one case, determining the error may involve determining a difference (e.g., an absolute difference) between the determined build value and the modeling value. In another case, the model may specify one or more modeling values (e.g., a set or range of values) that are permitted, such that values other than those modeling values are not permitted. Thus, the computing system may determine that there is an error if the determined build value is equivalent to an unpermitted value and may determine that there is no error if the determined build value is equivalent to a permitted modeling value. Other cases are also possible.

Given this, the computing system may then determine whether or not the determined error is exceeds a threshold error (e.g., at or above the threshold error) and may do so in various ways. In one case, if the error is determined based on a comparison to permitted value(s) in-line with the discussion above, then a determination of error in this case would automatically amount to a determination of a threshold error being exceeded. In another case, however, if error is determined based on a difference between the determined build value and the modeling value, then the computing system may determine whether or not the difference exceeds a threshold difference. Other cases are also possible.

As such, if the computing system then determines that the determined error does not exceed a threshold error, then the computing system may responsively determine that the first feature should be produced according to the determined build value of the first parameter, and may then do so as described in the present disclosure. However, if the computing system instead determines that the error does exceeds the threshold error, then the computing system may responsively determine that the first feature should be produced according to another value of the first parameter that causes the error associated with the first parameter to not exceed the threshold error. In practice, this other value could take various forms.

In one case, this other value could be a modeling/predefined value of the first parameter.

In another case, however, this other value could be a value that the computing system determines would allow for a relationship between the first and second parameters to be as close as possible to the pre-build relationship while causing the error associated with the first parameter to not exceed the threshold error.

For instance, given a target positional relationship seeking to maintain a distance of 1 m between a first position of a first feature and a second position of a second feature, the computing system may determine that maintaining this distance would cause an error associated with the first position to exceed a threshold error. In this instance, the computing system may determine that maintaining a distance of 0.9 m between those features would be substantially close to the target positional relationship and would not cause an error associated with the first position to exceed the threshold error. Thus, the computing system may determine that the first feature should be produced at the position that maintains the distance of 0.9 m between the features.

In one specific example of this scenario, referring again to the examples provided in FIGS. 7A-7E, the computing system determined the post-build observed value of the position X to be 2.5 m, which is different from the modeling value of position X that was set to a value of 2 m away from reference point 706. Consequently, the computing mode determined the build value of position Z to be 3.5 m away from reference point 706. And assuming that a modeling value of position Z was specified to be 3 m away from reference point 706, then the computing system may determine the error associated with position Z to be at a difference of 0.5 m (i.e., 3.5 m minus 3 m).

In this example, given a situation in which a threshold error is set to be at a threshold difference of 0.6 m, the computing system may determine that the determined error associated with position Z does not exceed the threshold error, and thus the computing system may responsively proceed with maintaining the pre-build relationship as described in FIGS. 7A-7E. On the other hand, in a situation in which a threshold error is set to be at a threshold difference of 0.3 m, the computing system may determine that the determined error associated with position Z does exceed the threshold error, and thus the computing system may responsively not maintain the pre-build relationship and may instead have the cup holder 702 be positioned in a position Z having a value that would allow for the threshold error to not be exceeded. Other examples are also possible.

In another example scenario, an error consideration may be with regards to a parameter having a value that is based on whether or not a received pre-build relationship is maintained. In particular, given a first pre-build relationship that defines a build value of a first parameter in terms of a post-build observed value of a second parameter, the computing system may determine whether or not to maintain that first pre-build relationship based on an error associated with a third parameter. In practice, the third parameter may have a value that is in some way dependent on or based on the determined build value of the first parameter. For instance, a second pre-build relationship may define a build value of the third parameter in terms of a post-build observed value of the first parameter, thereby making the second pre-build relationship dependent on the first pre-build relationship (i.e., sequence of relationships).

More specifically, the computing system may determine a build value of the first parameter based on the post-build observed value of the second parameter in-line with the discussion above. And based on the determined build value of the first parameter, the computing system may determine an error associated with the third parameter. To do so, the computing system may determine or predict a build value of the third parameter given the determined build value of the first parameter. For instance, the computing system may assume that the post-build observed value of the first parameter will be equivalent to the determined build value of first parameter or may actually determine the post-build observed value of the first parameter, and may then use the post-build observed value of the first parameter as basis for determining the build value of the third parameter in accordance with the second pre-build relationship. Regardless, once the computing system determines or predicts the build value of the third parameter, the computing system may then determine the error based on a comparison of the determined build value of the third parameter to a modeling value of the third parameter.

In particular, the model may specify a modeling value of the third parameter, which may be a preliminary value that is given to the third parameter before the build value of the third parameter is determined. But given the first pre-build relationship at issue and given that the third parameter may have a value that is in some way dependent on the determined build value of the first parameter, the determined build value of the third parameter may end up being different from the modeling value of the third parameter if the post-build observed value of the second parameter ends up being different from a modeling value of the second parameter. Thus, the error at issue may be determined based on a comparison of the determined build value of the third parameter to the modeling value of the third parameter.

In this example scenario, determination of the error based on the comparison of a build value to a modeling value could take various forms, such as those described above for instance. Furthermore, the computing system may then determine whether or not the determined error exceeds a threshold error using any of the techniques described above, among others.

Accordingly, if the computing system determines that the determined error associated with the third parameter does not exceed a threshold error, then the computing system may responsively determine that the first feature should be produced according to the determined build value of the first parameter, and may then do so as described in the present disclosure. But if the computing system instead determines that the error associated with the third parameter does exceeds the threshold error, then the computing system may responsively determine that the first feature should be produced according to another value of the first parameter that causes the error associated with the third parameter to not exceed the threshold error. In practice, this other value could take various forms.

In one case, this other value could be a predefined/modeling value of the first parameter.

In another case, however, this other value could be a value that the computing system determines would allow for a relationship between the first and second parameters to be as close as possible to the pre-build relationship while causing the error associated with the third parameter to not exceed the threshold error.

For instance, given a target positional relationship seeking to maintain a distance of 1 m between a first position of a first feature and a second position of a second feature, the computing system may determine that maintaining that distance would cause an error associated with a third position of a third feature to exceed a threshold error. In this instance, the computing system may determine that maintaining a distance of 0.8 m between those first and second features would be substantially close to the target positional relationship and would not cause an error associated with the third position to exceed the threshold error. Thus, the computing system may determine that the first feature should be produced at the position that maintains the distance of 0.8 m between the first and second features. Other instances are possible as well.

With this approach, the computing system could evaluate a determined build value of a first parameter in order to determine one or more errors associated with other parameters(s) having corresponding other value(s) that in some way depend on the value of the first parameter (e.g., based on a sequence of relationships). In this manner, the computing system could set the value of the first parameter to be a value that would allow the other value(s) of the other parameter(s) to each be within a respectively defined tolerance, thereby providing flexibility for subsequent production of a structure.

In practice, the computing system may facilitate this in one of various ways. For example, the computing system may express the pre-build relationship(s) and associated tolerance(s) in a set of equations and/or inequalities. Given this, the computing system may then determine one or more solutions to the set and/or carry out an optimization (e.g, a gradient descent optimization algorithm) to determine an optimal solution to the set. In either case, the solution(s) would provide, for the first and/or other parameter(s), respectively determined value(s) that are within respectively defined tolerance(s). And given these determined value(s), the computing system may then update the model to specify the determined value(s) and/or may use the determined value(s) as basis for determining subsequent structure production steps, among other options. Other examples are also possible.

In yet a further aspect, the computing system may evaluate an error associated with two or more parameters as basis for determining whether or not to prioritize pre-build relationship(s) over individual value(s) of parameter(s). In particular, the computing system may determine the error by comparing values (e.g., build and/or post-build values) of those two or more parameters to a predefined value, which may involve comparison of a sum or an average of those values to the predefined value, among other options. Additionally or alternatively, the computing system may determine the error by comparing those values to one another (e.g., deviation of the values from each other). In either case, in line with the discussion above, once the computing system determines the error, the computing system may then determine whether or not the error exceeds a threshold error and thus whether or not to produce certain feature(s) according to determined build values of parameters at issue.

By way of example, the computing system may determine an error associated with a sum of the lengths of all of a table's legs. For instance, the computing system may determine a post-build value respectively for the table's first and second legs and a build value respectively for the table's third and fourth legs. And the computing system may use those values to determine the sum of the lengths of all of the table's legs. Then, the computing system may determine the error by comparing the determined sum (e.g., 12.2 m) to a predefined value (e.g., 12 m) of the sum of the lengths of all of the table's legs, which may be a preliminary value representative of a modeled sum of the length of all of the table's legs. For instance, the computing system may determine a difference (e.g., 0.2 m) between the determined sum and the predefined value.

In this example, once the computing system determines the error, the computing system may then determine whether or not the determined error exceeds a threshold error. If the computing system determines that the determined error does not exceed the threshold error (e.g., a threshold difference of 0.5 m), then the computing system may proceed with maintaining pre-build relationships such as by instructing a robotic system to produce the third and fourth legs in accordance with the respectively determined build value. But if the computing system determines that the determined error does exceed the threshold error (e.g., a threshold difference of 0.1 m), then the computing system may responsively not maintain certain pre-build relationship(s) and may instead instruct the robotic system to produce the third and/or fourth legs in accordance with respective values that would allow for the threshold error to not be exceeded. Other examples are also possible.

V. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A computer-implemented method comprising:
    accessing a model that include values that define relationships between components of a structure that is to be manufactured by a robot, wherein the model includes multiple build values for a first component that are (i) defined before the structure is manufactured, and (ii) initially defined relative to to-be-determined value for a second component, wherein the to-be-determined value for the second component is determined based on an observation of a condition of the second structure after it is manufactured by the robot;
    determining, after the second component has been manufactured and before the manufacturing of the first component is complete, an observed condition of the second component;
    selecting, after the second component has been manufactured and before the manufacturing of the first component is complete, a particular value from among the multiple build values based on the observed condition of the structure; and
    using the selected, particular build value to complete the manufacturing of the first component according to the model.

2. The method of claim 1, wherein the observed condition of the second component comprises a position of the second component as the structure has actually been manufactured.

3. The method of claim 1, wherein the observed condition of the second component comprises an orientation of the second component as the structure has actually been manufactured.

4. The method of claim 1, wherein the observed condition of the second component comprises a size of the second component as the structure has actually been manufactured.

5. The method of claim 1, wherein the observed condition of the second component comprises a material property of the second component as the structure has actually been manufactured.

6. The method of claim 1, comprising receiving data correlating each of the multiple build values to a different observed condition through a graphical user interface from a designer.

7. The method of claim 1, wherein selecting the particular value comprises selecting a position to manufacture the first component based on an observed position of the second component, as the structure has actually been manufactured.

8. A non-transitory computer-readable storage device storing instructions, that when executed by one or more processors, cause performance of operations that comprise:
    accessing a model that include values that define relationships between components of a structure that is to be manufactured by a robot, wherein the model includes multiple build values for a first component that are (i)

defined before the structure is manufactured, and (ii) initially defined relative to to-be-determined value for a second component, wherein the to-be-determined value for the second component is determined based on an observation of a condition of the second structure after it is manufactured by the robot;

determining, after the second component has been manufactured and before the manufacturing of the first component is complete, an observed condition of the second component;

selecting, after the second component has been manufactured and before the manufacturing of the first component is complete, a particular value from among the multiple build values based on the observed condition of the structure; and using the selected, particular build value to complete the manufacturing of the first component according to the model.

9. The device of claim 8, wherein the observed condition of the second component comprises a position of the second component as the structure has actually been manufactured.

10. The device of claim 8, wherein the observed condition of the second component comprises an orientation of the second component as the structure has actually been manufactured.

11. The device of claim 8, wherein the observed condition of the second component comprises a size of the second component as the structure has actually been manufactured.

12. The device of claim 8, wherein the observed condition of the second component comprises a material property of the second component as the structure has actually been manufactured.

13. The device of claim 8, comprising receiving data correlating each of the multiple build values to a different observed condition through a graphical user interface from a designer.

14. The device of claim 8, wherein selecting the particular value comprises selecting a position to manufacture the first component based on an observed position of the second component, as the structure has actually been manufactured.

15. A computing system comprising:
one or more computers; and
one or more storage units storing instructions that when executed by the one or more computers cause the computing system to perform operations comprising:

accessing a model that include values that define relationships between components of a structure that is to be manufactured by a robot, wherein the model includes multiple build values for a first component that are (i) defined before the structure is manufactured, and (ii) initially defined relative to to-be-determined value for a second component, wherein the to-be-determined value for the second component is determined based on an observation of a condition of the second structure after it is manufactured by the robot;

determining, after the second component has been manufactured and before the manufacturing of the first component is complete, an observed condition of the second component;

selecting, after the second component has been manufactured and before the manufacturing of the first component is complete, a particular value from among the multiple build values based on the observed condition of the structure; and using the selected, particular build value to complete the manufacturing of the first component according to the model.

16. The system of claim 15, wherein the observed condition of the second component comprises a position of the second component as the structure has actually been manufactured.

17. The system of claim 15, wherein the observed condition of the second component comprises an orientation of the second component as the structure has actually been manufactured.

18. The system of claim 15, wherein the observed condition of the second component comprises a size of the second component as the structure has actually been manufactured.

19. The system of claim 15, wherein the observed condition of the second component comprises a material property of the second component as the structure has actually been manufactured.

20. The system of claim 15, comprising receiving data correlating each of the multiple build values to a different observed condition through a graphical user interface from a designer.

* * * * *